United States Patent
Johnson et al.

(10) Patent No.: US 12,399,266 B2
(45) Date of Patent: *Aug. 26, 2025

(54) MULTI-TARGET DETECTION USING CONVEX SPARSITY PRIOR

(71) Applicant: Anduril Industries, Inc., Costa Mesa, CA (US)

(72) Inventors: Jason Kyle Johnson, Fort Collins, CO (US); Dylan Scott Eustice, Boston, MA (US); Evan Jackson Everett, Fort Collins, CO (US); Shawn Michael Herman, Fort Collins, CO (US)

(73) Assignee: Anduril Industries, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,174

(22) Filed: Apr. 24, 2024

(65) Prior Publication Data

US 2024/0377524 A1 Nov. 14, 2024

Related U.S. Application Data

(63) Continuation of application No. 18/356,042, filed on Jul. 20, 2023, now Pat. No. 12,013,456.

(Continued)

(51) Int. Cl.
*G01S 13/58* (2006.01)
*G01S 7/292* (2006.01)
*G01S 13/72* (2006.01)

(52) U.S. Cl.
CPC .......... *G01S 13/581* (2013.01); *G01S 7/292* (2013.01); *G01S 13/726* (2013.01)

(58) Field of Classification Search
CPC ....... G01S 13/581; G01S 7/292; G01S 13/726

(Continued)

(56) References Cited

U.S. PATENT DOCUMENTS

| | | | | |
|---|---|---|---|---|
| 5,210,798 A | * | 5/1993 | Ekchian | G06V 10/255 348/909 |
| 5,355,325 A | * | 10/1994 | Uhlmann | G01S 13/726 342/189 |

(Continued)

FOREIGN PATENT DOCUMENTS

| | | | | |
|---|---|---|---|---|
| EP | 1018033 B1 | * | 3/2005 | ........... G01S 13/726 |
| EP | 3293537 A1 | * | 3/2018 | ............ G01S 13/56 |
| WO | WO-2008098915 A1 | * | 8/2008 | ........... G01S 13/726 |

OTHER PUBLICATIONS

Non-Final Office Action issued in corresponding U.S. Appl. No. 18/790,866, dated Sep. 24, 2024.

(Continued)

*Primary Examiner* — Nuzhat Pervin
(74) *Attorney, Agent, or Firm* — Knobbe, Martens, Olson & Bear, LLP; Andy Pho

(57) ABSTRACT

Provided is a method for detecting the trajectories of one or more targets in the field of view of one or more sensors, the method comprising: receiving one or more sensor frames corresponding to the one or more sensors; defining a space of allowable target states for the one or more sensor frames; specifying a set of potential target trajectories, each comprising one allowable target state for each of the one or more sensor frames; specifying target signal parameters for each of the allowable target states, such that the target signal parameters predict the expected target signal contribution corresponding to the one or more sensor frames; specifying a data fidelity objective to quantify how well the target signal parameters match the one or more sensor frames; specifying a sequence of one or more sparsity objectives to penalize a number of detected targets; determine the trajectories of one or more targets as follows: obtain values for all the target signal parameters in all the sensor frames, the obtained values being initialized values or previously opti- (Continued)

mized values, for each sparsity objective of the sequence, starting with the obtained target signal parameters, determine new target signal parameters to optimize the sum of the data fidelity objective and the sparsity objective; and storing the final trajectories in memory.

21 Claims, 23 Drawing Sheets

Related U.S. Application Data

(60) Provisional application No. 63/391,605, filed on Jul. 22, 2022.

(58) Field of Classification Search
USPC .......................................................... 342/104
See application file for complete search history.

(56) References Cited

U.S. PATENT DOCUMENTS

| | | | | |
|---|---|---|---|---|
| 5,537,119 | A * | 7/1996 | Poore, Jr. | G01S 13/726 342/96 |
| 5,793,931 | A * | 8/1998 | Hillis | G01S 13/726 706/13 |
| 5,960,097 | A * | 9/1999 | Pfeiffer | G06V 10/255 342/357.65 |
| 8,314,732 | B2 * | 11/2012 | Oswald | G01S 7/2926 342/195 |
| RE44,807 | E * | 3/2014 | Poore, Jr. | G01S 13/726 342/96 |
| 8,907,841 | B2 * | 12/2014 | Sahinoglu | G01S 13/5244 342/159 |
| 9,630,318 | B2 * | 4/2017 | Ibarz Gabardos | G06N 20/00 |
| 10,109,057 | B2 | 10/2018 | Benosman et al. | |
| 10,198,823 | B1 * | 2/2019 | Agrawal | G06T 7/194 |
| 10,531,806 | B2 * | 1/2020 | Principe | A61B 5/316 |
| 10,665,115 | B2 * | 5/2020 | Fragoso | G05D 1/102 |
| 10,802,131 | B2 * | 10/2020 | Nielsen | G01S 13/726 |
| 10,880,451 | B2 * | 12/2020 | Deshmukh | G06T 1/0028 |
| 10,943,145 | B2 * | 3/2021 | Wang | G06V 20/62 |
| 11,182,592 | B2 * | 11/2021 | Li | G06V 10/462 |
| 11,330,982 | B2 * | 5/2022 | Adler, Jr. | A61N 5/1064 |
| 11,392,859 | B2 * | 7/2022 | Basu | G06F 17/18 |
| 11,449,985 | B2 * | 9/2022 | Stanitsas | G06T 17/10 |
| 11,614,508 | B1 * | 3/2023 | Wang | G06T 7/0012 324/309 |
| 11,726,197 | B2 * | 8/2023 | Baskaran | G01S 13/723 342/107 |
| 11,748,897 | B1 * | 9/2023 | Burgoyne | G06V 20/13 382/103 |
| 12,013,456 | B2 | 6/2024 | Johnson et al. | |
| 2002/0008657 | A1 * | 1/2002 | Poore, Jr. | G01S 3/7864 342/96 |
| 2003/0058157 | A1 * | 3/2003 | Sassman | G01S 13/726 342/107 |
| 2008/0169968 | A1 * | 7/2008 | Easthope | G01S 13/726 342/95 |
| 2010/0109938 | A1 * | 5/2010 | Oswald | G01S 13/522 707/E17.014 |
| 2010/0207629 | A1 * | 8/2010 | Trzasko | G01R 33/561 324/309 |
| 2011/0085643 | A1 * | 4/2011 | Zhu | A61N 5/1031 378/65 |
| 2012/0093359 | A1 * | 4/2012 | Kurien | G06V 10/95 382/103 |
| 2013/0188856 | A1 | 7/2013 | Adler, Jr. et al. | |
| 2013/0335528 | A1 * | 12/2013 | Vishwanath | G06T 17/00 348/46 |
| 2014/0327566 | A1 * | 11/2014 | Burgio | G01S 13/343 342/108 |
| 2015/0022390 | A1 * | 1/2015 | Mansour | G01S 3/74 342/22 |
| 2016/0096270 | A1 * | 4/2016 | Ibarz Gabardos | B25J 9/0081 901/3 |
| 2016/0242690 | A1 * | 8/2016 | Principe | A61B 5/316 |
| 2017/0176994 | A1 * | 6/2017 | Yedidia | G06N 7/01 |
| 2017/0193830 | A1 * | 7/2017 | Fragoso | G08G 5/55 |
| 2017/0291301 | A1 * | 10/2017 | Ibarz Gabardos | B25J 9/1697 |
| 2018/0106898 | A1 | 4/2018 | Baskaran et al. | |
| 2018/0329034 | A1 * | 11/2018 | Bilik | G01S 7/354 |
| 2019/0107615 | A1 * | 4/2019 | Eljarat | G01S 13/505 |
| 2020/0057090 | A1 * | 2/2020 | Stachnik | G01P 3/665 |
| 2021/0072348 | A1 * | 3/2021 | Malas | G01S 7/021 |
| 2021/0096231 | A1 * | 4/2021 | Destefano | G01S 13/0218 |
| 2021/0278517 | A1 * | 9/2021 | Takahashi | G01S 7/292 |
| 2021/0364771 | A1 * | 11/2021 | Wetzstein | G02B 21/008 |
| 2022/0004762 | A1 * | 1/2022 | Kottenstette | G06V 10/764 |
| 2022/0026557 | A1 * | 1/2022 | Arbabian | G01S 13/726 |
| 2022/0067417 | A1 * | 3/2022 | Banerjee | H04N 23/64 |
| 2022/0196798 | A1 * | 6/2022 | Chen | G01S 7/354 |
| 2022/0198611 | A1 * | 6/2022 | Jia | H04N 25/671 |
| 2022/0379478 | A1 * | 12/2022 | Raghunathan | B25J 9/163 |
| 2023/0179285 | A1 * | 6/2023 | Su | H04W 16/18 455/25 |
| 2023/0215055 | A1 * | 7/2023 | Dai | G06T 9/005 382/232 |
| 2024/0402326 | A1 | 12/2024 | Johnson et al. | |

OTHER PUBLICATIONS

International Preliminary Report on Patentability and Written Opinion in Application No. PCT/US2023/028270, dated Jan. 28, 2025, in 6 pages.

* cited by examiner

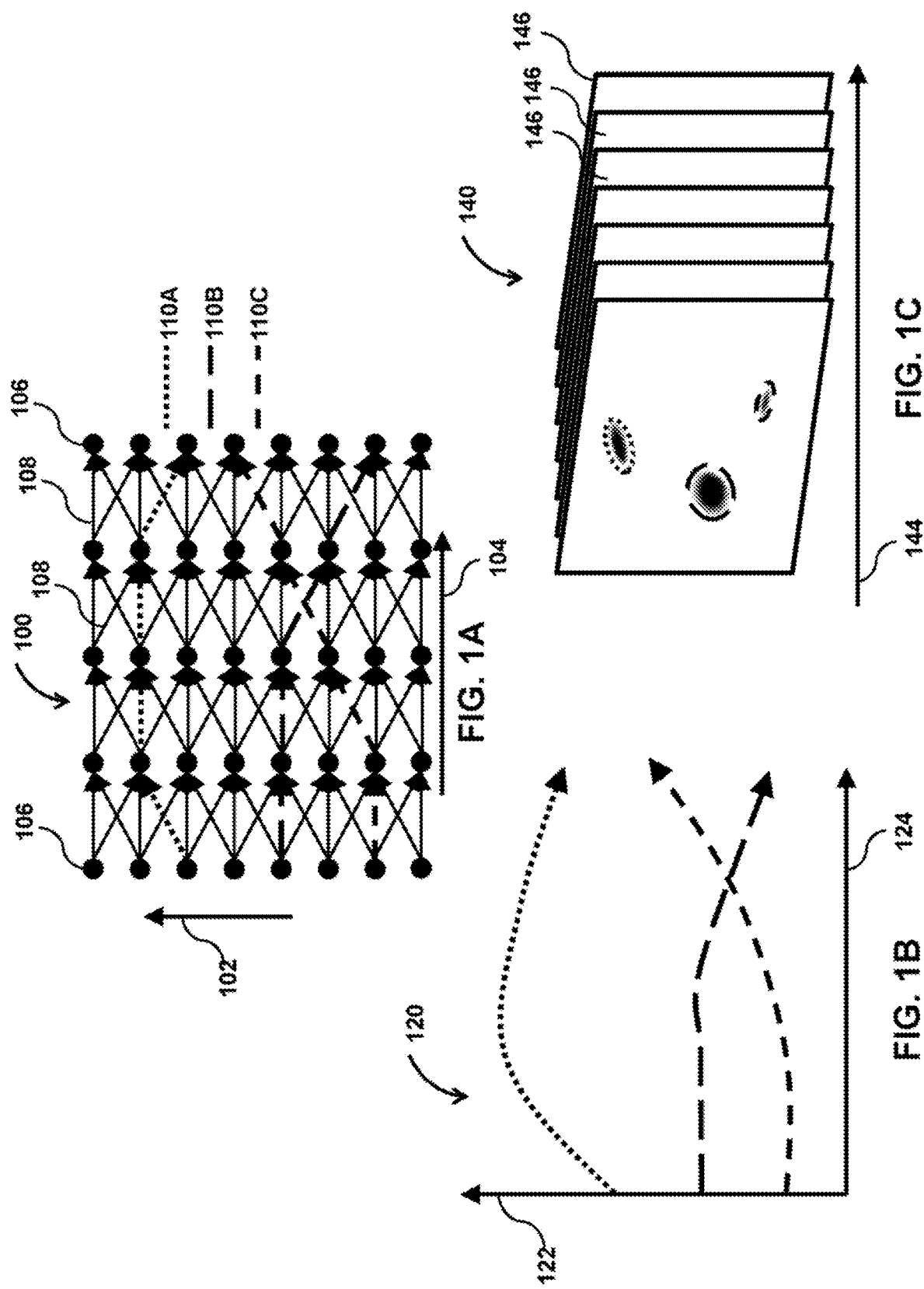

MULTI-TARGET DETECTION USING CONVEX SPARSITY PRIOR

CROSS-REFERENCE TO RELATED APPLICATIONS

The present application is a continuation of U.S. patent application Ser. No. 18/356,042, titled MULTI-TARGET DETECTION USING CONVEX SPARSITY PRIOR, filed 20 Jul. 2023, which claims the benefit of U.S. Provisional Patent Application 63/391,605, titled MULTI-TARGET DETECTION USING CONVEX SPARSITY PRIOR, filed 22 Jul. 2022. The entire content of each afore-mentioned patent filing is hereby incorporated by reference.

BACKGROUND

1. Field

The present disclosure relates generally to object detection for surveillance systems.

2. Description of the Related Art

Various techniques are used to detect objects in sensor data—where sensor data may include images (like two- or higher-dimensional spatial arrays of values indicative of intensity of received radiated signals in one or more channels), which may be moving images (e.g., video or video analog), a series of still images, or even a single image. Detection of objects may be useful in defense and/or security applications. Based on detection of objects, movement of detected objects may be subsequently tracked. In some cases, objects are difficult to detect because of noise in images, where the signal response corresponding to an object may not rise above the noise level.

SUMMARY

The following is a non-exhaustive listing of some aspects of the present techniques. These and other aspects are described in the following disclosure.

Some aspects include a method for jointly detecting multiple targets, which may include detection of multiple targets which are proximate to one another such that their signals may interfere with one another (including constructively and/or destructively) in one or more frames.

Some aspects include a convex sparsity-inducing formation for an optimization problem, including one where the optimization problem can then be solved without pre-enumerated trajectories and based on reduced enumeration of multi-target trajectories.

Some aspects of the method include processing of multiple frames of sensors data for object and trajectory identification.

Some aspects of the method may identify objects based on a single frame of sensor data, where a single-frame target trajectory may be the object's location in the given frame.

Some aspects include a method for detecting the trajectories of one or more targets in the field of view of one or more sensors, the method comprising: receiving one or more sensor frames corresponding to the one or more sensors; specifying a set of potential target trajectories, each comprising one allowable target state for each of the one or more sensor frames; specifying target signal parameters for each of the allowable target states, such that the target signal parameters predict the expected target signal contribution corresponding to the one or more sensor frames; specifying a data fidelity objective to quantify how well the target signal parameters match the one or more sensor frames; specifying a sequence of one or more sparsity objectives to penalize a number of detected targets; determine the trajectories of one or more targets as follows: obtain values for all the target signal parameters in all the sensor frames, the obtained values being initialized values or previously optimized values, for each sparsity objective of the sequence, starting with the obtained target signal parameters, determine new target signal parameters to optimize the sum of the data fidelity objective and the sparsity objective; and storing the final trajectories in memory.

Some aspects include a system, A system comprising: one or more sensors; memory; and one or more processors coupled to the sensor, the one or more processors being configured to: receive one or more sensor frames corresponding to the one or more sensors; specify a set of potential target trajectories, each comprising one allowable target state for each of the one or more sensor frames; specify target signal parameters for each of the allowable target states, such that the target signal parameters predict the expected target signal contribution corresponding to the one or more sensor frames; specify a data fidelity objective to quantify how well the target signal parameters match the one or more sensor frames; specify a sequence of one or more sparsity objectives to penalize a number of detected targets; determine the trajectories of one or more targets as follows: obtain values for all the target signal parameters in all the sensor frames, the obtained values being initialized values or previously optimized values, for each sparsity objective of the sequence, starting with the obtained target signal parameters, determine new target signal parameters to optimize the sum of the data fidelity objective and the sparsity objective; and store the final trajectories in the memory.

Some aspects include a radar sensor.

Some aspects include an electro-optical/infrared sensor.

BRIEF DESCRIPTION OF THE DRAWINGS

The above-mentioned aspects and other aspects of the present techniques will be better understood when the present application is read in view of the following figures in which like numbers indicate similar or identical elements:

FIGS. 1A-1C depict a representational diagram showing a representation of example target state space, target trajectories and target signal parameters, in accordance with one or more embodiment.

FIGS. 5A-5F are graphs depicting example target signals and detection operations in multiple frames of data for four well-separated targets with varying intensity, in accordance with one or more embodiment.

Figure 2B:
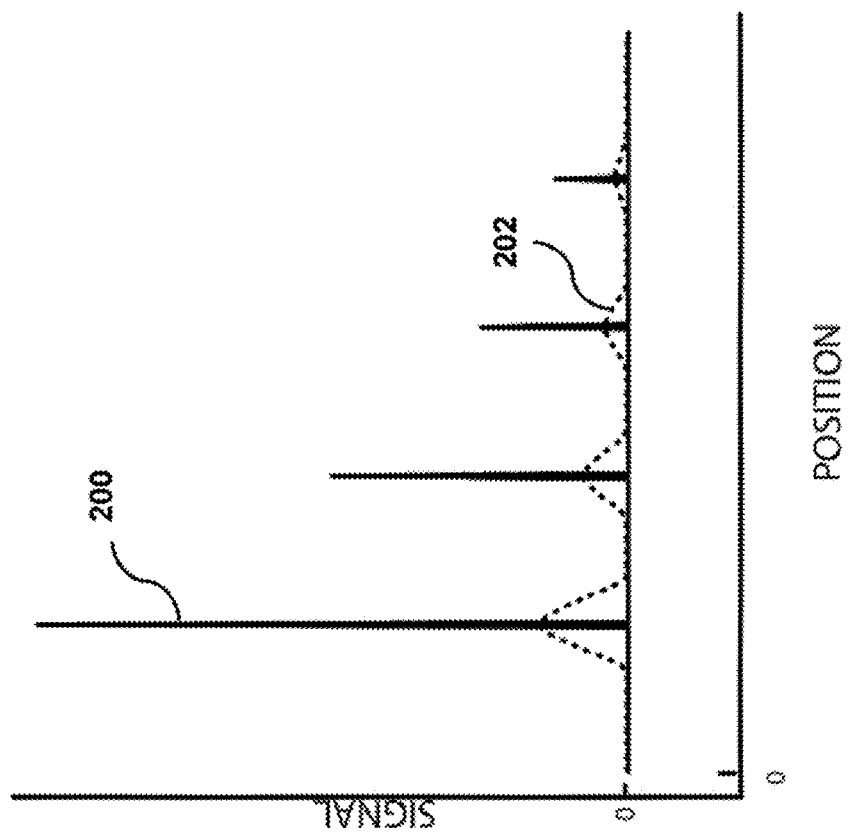
FIGS. 2A-2F are graphs depicting example target signals and detection operations in one-dimension for four well-separated targets with varying intensity, in accordance with one or more embodiment.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of object detection. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

As used herein, "optimal", "best", and other like superlatives may refer to something (e.g., function, value, trajectory, etc.) that corresponds to a result of an optimization procedure, including a global or local maximum or minimum. Optimal should not be taken as limiting an object to the absolute greatest, best, or any other superlative for all possible orientations, values, considerations, etc. of said object. It should be understood that optimal may refer to a best iteration (e.g., of a solution, path, etc.) such as can be practically described by limitations of computational power, accuracy, reproducibility, etc. Multiple things, including multiple instances of the same item or instances of different items, may be identified as optimal in some embodiments. In some embodiments, further determination may be used to choose a most optimal object from among a set of objects identified as optimal.

There are numerous surveillance applications that involve the detection and subsequent tracking of moving objects present in a sequence of frames generated by one or more sensors observing a volume of space. Herein, a "frame" is a generalization of an image produced by a camera or other sensor, but it need not have two dimensions. Some examples of frames include (i) an image produced by an EO/IR (electro-optical/infrared) camera, (ii) a range-Doppler map produced by a radar for a given angular dwell, and (iii) a range-bearing map produced by a radar for an entire scan. Each frame may be the result of a sensor applying various signal processing algorithms, such as matched filtering for a radar, to signals that were received during a given period. Some sensors may receive reflections of signals they have transmitted, such as radars, sonars, and lidars. Other sensors may passively receive signals generated by other sources, such as EO/IR sensors. One example of a detection and tracking application is the use of one or more radars to detect and track aircraft, missiles, or drones. Another example is the use of one or more ground-based EO/IR telescopes to detect and track orbital objects, such as satellites and space debris. Yet another application is the use of sensors, such as radar, lidar, or video cameras, on a driverless car to detect and track surrounding vehicles. Another example is the use of sonar to detect and track underwater vehicles, such as submarines.

In addition to returns from objects of interest, each frame may include noise-such as noise due to thermal effects, clutter, and environmental interference (among other things). For an object to be detected and tracked reliably, ideally its contribution in a frame should be stronger than the typical noise contribution. However, this may not be the case, including if an object is small, distant from the sensor, partially obscured, etc. Objects that cannot be reliably detected in a frame because of their weak signal contributions (e.g., with respect to signal to noise ratio (SNR)) may be referred to herein as "dim" targets. For example, a small drone observed by a radar at a significant distance may produce a reflected signal that is too weak to be distinguished from noise in a range-Doppler map or a range-bearing scan.

Fortunately, dim targets that cannot be reliably detected in a single frame may be detectable using multi-frame techniques. Multi-frame detection is broadly referred to as "track before detect" (TBD). TBD techniques leverage (i) the consistency of target returns across sensor frames and (ii) the inconsistency of noise signals during the same period. For example, if a dim target was stationary in a set of sensor frames (i.e., residing in the same cell or pixel), simply adding the single-frame detection statistics cell-for-cell would strengthen the target return, while leaving the energy in cells containing random noise largely unchanged. Therefore, a dim target that was undetectable in a single frame might be easily detectable by examining multiple frames. Unfortunately, this simplistic frame-stacking approach may only work for stationary targets. For a moving target, the multi-frame integration may instead combine returns across the correct trajectory (i.e., sequence of cells/pixels containing the object returns). However, the trajectory for an object may be unknown before the object has been detected. Therefore, if each frame contains N cells/pixels, and there are M frames of sensor data to process, there could be as many as $O(N^M)$ trajectories to be searched. If we restrict the set of feasible trajectories such that a target may transition from each cell of one frame to Q cells in the next frame, then we still have $O(NQ^{M-1})$ trajectories. Because most surveillance applications must run in real-time, this exponential computational complexity of TBD/multi-frame techniques can be daunting.

To address this computational challenge, many TBD/multi-frame techniques limit the number of trajectories to be searched for dim targets by either (i) adopting a small, pre-enumerated set of simplistic dynamic models that significantly limit how a target might move from frame to frame (so-called velocity matched filtering), or (ii) only postulating target motion along a relatively small set of "best" trajectories generated efficiently by dynamic programming. The latter technique may be preferable from both the perspective of detection performance and the perspective of efficiency. With regard to detection, it may not constrain the possible object trajectories to a small set of pre-enumerated possibilities. With regard to efficiency, it may only search the most promising (e.g., highest SNR) trajectories. However, many surveillance applications may require the detection and tracking of multiple objects in a surveillance volume, which increases the size of the trajectory search space exponentially—$O(N^K Q^{K(M-1)})$ for N cells/pixels, M frames, Q transitions per cell/pixel, and K targets. To maintain real-time operation, current approaches may decompose the multi-target detection problem into separate single-target searches. For example, some multi-target approaches may find the brightest (e.g., highest SNR) trajectory, remove that first target's contribution from the sequence of sensor frames, and then repeat the process by searching for the next-brightest target. The iteration may cease when no sufficiently bright targets can be found. Unfortunately, replacing the search for joint multi-target trajectories with a sequence of single-target searches may only be advisable if the targets are sufficiently far apart in each sensor frame as to be non-interacting. Specifically, the target energy (e.g., strength of the signal corresponding to the target) in each cell/pixel of each sensor frame may be required to be essentially due to a single object. When targets are closely spaced, the full joint trajectory space may need to be searched for optimal detection performance.

In order to optimize over the space of all possible multi-target trajectories, it may be important to promote sparse solutions that explain the observation data well with as few targets as possible (Occam's razor) to avoid over-fitting noise and declaring false targets. In some embodiments, this may be achieved by augmenting a data fidelity objective with a combinatoric sparsity prior, such as the $l_0$-norm, which may count the number of hypothesized targets. Unfortunately, the addition of a combinatoric prior may result in a non-convex optimization problem, such that local search methods may be prone to becoming trapped in spurious suboptimal local minima. To overcome this challenge, methods utilizing convex regularization priors, such as the $l_1$-norm, have been developed in compressive sensing to provide an optimization formulation that may be tractable to solve optimally while still promoting sparse solutions. In some embodiments, the use of convex sparsity priors to tractably search the space of multiple maneuvering target hypotheses allow detection of multiple objects, including with different trajectories, different separations, different brightnesses, etc. Furthermore, because the number of single-target paths may be exponentially large, in some embodiments a Viterbi method may be used to efficiently identify optimal paths to include in the joint optimization. In some embodiments, the multi-target detection may proceed by optimizing over a subspace of candidate target trajectories. This subspace may be iteratively grown and refined using the Viterbi method to either detect new paths or replace existing paths that become suboptimal as new paths are added. The method may terminate when the next best path (e.g., for growing the subspace) is below a detection threshold. In some embodiments, this termination criteria may ensure that the solution has reached the global optimum of the convex objective over the space of all multi-target trajectories. In some embodiments, this approach may be further enhanced via a non-convex continuation method that refines the convex solution by interpolating between the convex and combinatoric sparsity priors. This may allow the convex method to first find a global solution of the convex relaxation, but then may refine the solution (e.g., enhancing sparsity) to converge to a nearby local minimum of the non-convex combinatoric optimization. By warm-starting the non-convex optimization with the global optimum of the convex relaxation, in some embodiments the ability to either identify the global optimum or a near-optimal local optimum of the original sparse optimization problem may be improved.

One or more of the embodiments described herein may provide an efficient, optimal method for jointly detecting multiple targets, including those that are close enough to interfere constructively or destructively, in one or more sensor frames. This may be accomplished by using a convex sparsity-inducing formulation of the underlying optimization problem that may be solved without recourse to either simplistic pre-enumerated multi-target trajectories or computationally impractical enumeration of multi-target trajectories. Although some embodiments process multiple frames of sensor data, such as when needed to detect dim targets, the method may have value in some embodiments even when detecting targets in a single frame of sensor data. (A single-frame target "trajectory" is simply the object's state in the given frame.) That said, embodiments are not limited to implementations affording all of these benefits, as various engineering and cost tradeoffs are contemplated, which is not to suggest that any other description herein is limiting.

Linear Signal Model

In some embodiments, it may be assumed that one or more sensors generate a collection of frames of data $y_1, \ldots, y_n$. Each frame may represent, e.g., an image or scan of the environment at different points in time, from the perspective of different sensors, etc. Each frame may be described by a vector $y_f$ of all measurements in a given image or scan. The vector $y=(y_1, \ldots, y_n)$ may therefore denote the vector concatenation of all frames. In a simplest case, it may be considered that the data is comprised of the signal due to any target present in the scene and noise (e.g., random white noise). Then, how target energy manifests in the sensor data may be modeled. In each frame, a discrete set of observable target states $V_f$ may be hypothesized. This may be discrete samples of a continuous target space, e.g., target position and velocity. $V = \cup_f V_f$ may therefore denote the set of all frame's target states. The target energy may be modeled by assigning some signal parameter $x_v$ to each possible target state, e.g., target irradiance in imaging, target radar cross-section (RCS) in radar, etc. A linear response $y_f = A_f x_f$ may be assumed, such that scaling the target signal likewise scales the target response by the same amount and the response due to multiple targets is the sum of their individual response. If no target is present, $x_v = 0$ and $y=0$. The matrix $A_f$ may encode the point spread function (PSF) of the sensor for all sampled target hypotheses. This linear model may encode target-dependent effects, such as target streaking within an image due to the motion of the target during the collection of a single sensor frame. Another example of a target-dependent effect is the doppler shift of a target return in pulse-doppler radar, caused by the range-rate of the target relative to the sensor.

In applications that have structured background noise and clutter, the methods described herein may be combined with one or more pre-processing algorithms that register multiple data frames, perform background estimation across all frames, and then remove the background estimate from each frame. Then, the residual background-subtracted images may be processed under the model of target signal plus additive white noise.

Target Dynamic Model

When frames may be collected at different times, the target dynamics may be modeled to allow detection of moving targets in multiple frames of data. This target movement may be specified by a collection of allowed target state transitions on the per-frame target states $V_f$.

FIGS. 1A-1C depict a representational diagram showing a representation of example target state space, target trajectories and target signal parameters. FIG. 1A depicts a graph 100 of feasible target dynamics over state space (along axis 102) and time (along axis 104). FIG. 1A depicts paths of three objects, represented by dashed lines 110a, 110b, and 110c, between various state spaces as a function of time. The graph 100 depicts nodes 106, which may represent allowable target states, and allowable transitions 108 between nodes, which may represent part of one or more trajectories. FIG. 1B depicts a graph 120 of target trajectories over position (along axis 122) of the three objects of FIG. 1B, represented by dashed lines 110a, 110b, and 110c as a function of time (along axis 124). FIG. 1C depicts a graph 140 of image sequences 146 capturing target positions (e.g., the image location) and target parameters (e.g., the image values) of the three objects of FIGS. 1A and 1B over time (along axis 144), represented by areas encircled by dashed lines 110a, 110b, and 110c.

As depicted in FIG. 1A, V may be considered to be the nodes 106 of the graph 100 with directed edges E (e.g., transitions 108) representing allowed target dynamics, i.e., with edges (u, v) between feasible state transitions u→v. Then, the space of multi-frame target hypotheses may be comprised of all directed paths Γ of a direct graph G=(V,E) (e.g., the graph 100). It may be assumed that by the Markov property the allowed future dynamics of the target may only depend on its current target state (e.g., not on earlier states). For a trajectory $\gamma=(v_1, \ldots, v_n) \in \Gamma$, such as depicted in FIG. 1B, $x_\gamma=(x_{v_1}, \ldots, x_{v_n})$ may denote the target signal parameters along its trajectory. This may allow the target to potentially have a different signal response in each frame. $x=(x_\gamma, \gamma \in \Gamma)$ may then denote the collection of all target trajectories signal parameters. In some embodiments, the total target signal response may be given by y=Ax. The linear operator may be decomposed into two steps, such as $A=A_V A_\Gamma$. First, $x_V=A_\Gamma x$ may compute the sum of all paths through every vertex v, i.e., $x_v = \Sigma_{\gamma | v \in \gamma} (x_\gamma)_v$. The may represent the action of the linear operator $A_\Gamma$. Second, the response in each frame, such as depicted in FIG. 1C, may be computed as $y_f = A_f x_{V_f}$ using the point-spread function for that frame. This may represent the action of the linear operator $A_V$, which may be a block-diagonal matrix formed from the per-frame PSF models ($A_1, \ldots, A_n$).

Convex Optimization Formulation with Target Detection and Estimation

In some embodiments, it may be assumed the target signal is corrupted with measurement noise according to a linear model, which may be described by Equation (1), below:

$$y = Ax + w \quad (1)$$

where x is the target signal, A is a linear mapping from target signal into observation space, and w is noise (e.g., measurement noise). Assuming independent noise and zero-mean Gaussian error distribution w~N(0, R) with a error covariance matrix R, it is then possible to solve for x that minimizes the weighted least-squares measurement error, such as by application of Equation (2), below:

$$\|y - Ax\|^2_{R^{-1}} = (y - Ax)^T R^{-1} (y - Ax). \quad (2)$$

However, in some embodiments, x has been formed based on all possible target trajectories and only a small number of targets are expected to be present. Hence, in some embodiments, a sparsity regularization term may be added, such as in order to encourage sparse solutions. This may be achieved using the weighted group sparsity norm, such as provided by Equations (3) and (4) below:

$$\|x\|_{\Gamma, W} \triangleq \sum_{\gamma \in \Gamma} \|W_\gamma x_\gamma\| \quad (3)$$

$$= \sum_{\gamma \in \Gamma} \left( \sum_{v \in \gamma} (W_\gamma x_\gamma)_v^2 \right)^{1/2} \quad (4)$$

Then, in some embodiment, the following convex optimization problem, e.g., as given by Equation (5), below, may be solved:

$$\min_x \left\{ \frac{1}{2} \|y - Ax\|^2_{R^{-1}} + \|x\|_{\Gamma, W} \right\} \quad (5)$$

Weight matrices $W_\gamma$ may serve as regularization parameters, which may control the weight placed on the sparsity prior relative to measurement mismatch. In some embodiments, if the optimal solution to this problem is x=0, then no targets are detected (the measurements may be explainable as noise). Otherwise, only a sparse set of paths may be expected to have non-zero values in x. This sparse support of x then may then indicate one or more target detections.

In some embodiments, this approach leads to a result that is the solving of a strictly convex optimization problem. In some embodiments, this may ensure that there is a unique global optimal solution (no spurious local minima or ambiguous solutions) and simple scalable optimization techniques may reliably and efficiently converge to this solution.

Information Form

In some embodiments, it may be convenient to put this convex optimization problem into an equivalent form with the following information parameters (e.g., as given by Equations (6) and (7) below):

$$J = A^T R^{-1} A \quad (6)$$

$$h = A^T R^{-1} y \quad (7)$$

In this parameterization, the convex optimization problem may be equivalently stated as:

$$\min_x \left\{ \frac{1}{2} x^T J x - h^T x + \|x\|_{\Gamma, W} \right\} \quad (8)$$

Both forms of the problem, being equivalent, have the same solution. One motivation for considering the above form is that it may be the most compact representation of the model A and data y sufficient to optimally solve the detection problem. The vector h may be of paramount importance for detection purposes, corresponding to the matched filter statistic of the whitened observation data $R^{-1}y$ under the target hypotheses enumerated in A. More precisely, a given trajectory hypothesis $\gamma$ has associated matched filter statistic $h_\gamma = A[:,\gamma]^T R^{-1} y$, such that $\|h_\gamma\|^2$ may be the optimal detection statistic for hypothesis $\gamma$. The matrix J may specify the level of interaction between competing hypotheses, $J_{\gamma_1,\gamma_2} = A[:,\gamma_1]^T R^{-1} A[:,\gamma_2]$. This may be a measure of how much the signal models of the two hypotheses overlap, which may be essential information when considering multi-target hypotheses (e.g., to select among competing explanations of an observed target signal while avoiding redundant detections, or to resolve multiple closely spaced targets).

Group Coordinate Descent Method

In some embodiments, a general approach to solve problems of this form may involve iterative solution of sub-problems in which may involve minimization with respect to just the group of variables $x_\gamma$ associated with a single candidate target trajectory $\gamma \in \Gamma$ while all other optimization variables may be held fixed. This may reduce the problem to a form given by Equation (9), below:

$$\min_{x_\gamma} \left\{ \frac{1}{2} \|y'_\gamma - A_\gamma x_\gamma\|^2_{R_\gamma^{-1}} + \|W_\gamma x_\gamma\| \right\} \quad (9)$$

Here, the trajectory $y'_\gamma = y - A_{\backslash\gamma} x_{\backslash\gamma}$ may be the residual measurement after removing contributions from all other target trajectories except for $\gamma$ itself. $A_\gamma = A[:,\gamma]$ is the submatrix of A with columns indexed by vertices $v \in \gamma$, thus it may span the measurement subspace that can be explained by target hypothesis $\gamma$.

Group Shrinkage Operators

Importantly, the optimal solution may be zero $x^*_\gamma = 0$ if $\|W_\gamma^{-T} A_\gamma^T R_\gamma^{-1} y'_\gamma\| \leq 1$. Thus, target hypotheses that do not fit the data well may be extinguished. If $\|W_\gamma^{-T} A_\gamma^T R_\gamma^{-1} y'_\gamma\| > 1$ then the optimal solution lies along a 1-D curve with parameter s, which may be given by Equations (10) and (11), below:

$$x^*_\gamma(s) = (A_\gamma^T R^{-1} A_\gamma + s^{-1} W_\gamma^T W_\gamma)^{-1} A_\gamma^T R^{-1} y'_\gamma \quad (10)$$

$$= (J_\gamma + s^{-1} W_\gamma^T W_\gamma)^{-1} h'_\gamma \quad (11)$$

The optimal solution may be determined by solving for $s > 0$ to satisfy the condition $\|W_\gamma x^*_\gamma(s)\| = s$. This computation is described in Algorithm 1 with inputs expressed in information form, i.e., $h'_\gamma = A_\gamma^T R^{-1} y'_\gamma$ and $J_\gamma = A_\gamma^T R^{-1} A_\gamma$. In this notation, the condition for a detection is $\|W_\gamma^{-T} h'_\gamma\| > 1$, i.e., that there is sufficient power in the inverse-weighted residual match filter statistic.

---

Algorithm 1 Generalized Group Shrinkage with Line Search

1: Input: $h_\gamma' = h'[\gamma]$, $J_\gamma = J[\gamma, \gamma]$, $W_\gamma$
2: Parameter: $t \in [0, 1]$
3: Output: Solution $x_\gamma^*$ of the convex optimization problem $$\min_{x_\gamma} \left\{ \frac{1}{2} x_\gamma^T J_\gamma x_\gamma - (h'_\gamma)^T x_\gamma + t\|W_\gamma x_\gamma\| \right\}$$

---

Algorithm 1 Generalized Group Shrinkage with Line Search

4: $b = W_\gamma^{-T} h_\gamma'$
5: if $\|b\| < t$ then
6:    $x_\gamma^* = 0$ // Shrunk to zero, non-detection
7: else
8:    $H = W_\gamma^{-T} J_\gamma W_\gamma$
9:    Compute $H = UAU^T$ such that $\Lambda = \text{diagm}(\lambda) > 0$, $U^T U = 1$ // Matrix Eigendecom-position
10:    $b' = U^T b$
11:    Define 1-D function $g(s) = \sum_i \left(\frac{b'_i}{1+s\lambda_i}\right)^2$
12:    Solve $g(s) = 1$ for $s \in (0, \|J_\gamma^{-1} h_\gamma'\|)$ // e.g., 1-D Bisection Search
13:    $x_\gamma^* = (J_\gamma + t^2 s^{-1} W_\gamma^T W_\gamma)^{-1} h_\gamma'$ // Nonlinear Shrinkage
14: end if
15: RETURN $x_\gamma^*$

---

There may be a special case where a closed-form non-iterative solution is obtained. Let $W_\gamma^T W_\gamma = \rho J_\gamma$. Then, the optimal solution may then be $x^*_\gamma = W_\gamma^{-1} \Phi_\rho(W_\gamma \widehat{x_\gamma})$ where $\widehat{x_\gamma}$ is the (un-regularized) least-squares solution, such as given by Equations (12) and (13), below:

$$\hat{x}_\gamma = (A_\gamma^T R^{-1} A_\gamma)^{-1} A_\gamma^T R^{-1} y'_\gamma \quad (12)$$

$$= J_\gamma^{-1} h'_\gamma \quad (13)$$

and $\Phi_\rho$ is the group shrinkage operator, such as given by Equations (14) and (15), below:

$$\Phi_\rho(x) = \begin{cases} \left(\frac{\|x\|-\rho}{\|x\|}\right)x, & \|x\| > \rho \\ 0, & \|x\| \leq \rho \end{cases} \quad (14)$$

$$= \max\left(0, \frac{\|x\|-\rho}{\|x\|}\right)x \quad (15)$$

This solution may be computed efficiently as detailed in Algorithm 2. In this group shrinkage approach, $\rho$ may play the role of a detection threshold with respect to $\|W_\gamma \widehat{x_\gamma}\|$. If the evidence for presence of a target, measured by the weighted-norm of the least-squares fit, is above the threshold $\rho$ then the target may be detected. Otherwise, the target signal may be set to zero and the measurement may be explained by noise and other target hypotheses.

---

Algorithm 2 Group Shrinkage

1: Input: $h_\gamma' = h'[\gamma]$, $J_\gamma = J[\gamma, \gamma]$, $W_\gamma$, $\rho$
2: Requires: $W_\gamma^T W_\gamma = \rho J_\gamma$
3: Parameter: $t \in [0, 1]$
4: Output: Solution $x_\gamma^*$ of the convex optimization problem $$\min_{x_\gamma} \left\{ \frac{1}{2} x_\gamma^T J_\gamma x_\gamma - (h'_\gamma)^T x_\gamma + t\|W_\gamma x_\gamma\| \right\}$$

5: $\hat{x}_\gamma = J_\gamma^{-1} h_\gamma'$

6: $s = \max\left(0, \frac{\|W_\gamma \hat{x}_\gamma\| - t\rho}{\|W_\gamma \hat{x}_\gamma\|}\right)$

| Algorithm 2 Group Shrinkage |
|---|
| 7: $x_\gamma^* = s\hat{x}_\gamma$ |
| 8: RETURN $x_\gamma^*$ |

Iterative Group Coordinate Descent

In some embodiments, to solve the convex optimization problem with respect to a tractably sized set of paths $S \subset \Gamma$, this set of paths may be iteratively cycled through, applying the group shrinkage operator to update each path's estimate $x_\gamma$ conditioned on the preceding value of all other paths (to compute the residual measurement $y'_\gamma$). This simple procedure may be guaranteed to converge to the global optimum, in some embodiments. See Algorithm 3 for detailed description of the general approach. Note that in some embodiments, Algorithm 3 may be warm started with an initial guess for the solution to accelerate convergence. In some embodiments, this feature may also be used later in the subspace pursuit method. This approach may solve for the joint optimization seen on Line 3, by iterative solution of smaller, simpler problems on Line 11. In some embodiments, this approach may be best suited for cases where the subproblem may be solved very efficiently (e.g., have closed-form non-iterative solutions). This may be the case when the quadratic and sparsity terms have similar shapes, i.e., $W_\gamma^T W_\gamma \propto J_\gamma$, in which case the subproblem may be solved using the group shrinkage method described in Algorithm 2. More generally, a simple 1-D search may still be solved to compute a nonlinear shrinkage solution of the subproblem described in Algorithm 1. Alternatively, one may also utilize the ADMM (Alternating Direction Method of Multipliers) to still leverage the very efficient group shrinkage method in the general case, to avoid having to do any line-search for each update.

| Algorithm 3 Path-Wise Group Coordinate Descent |
|---|
| 1: Input: $S \subset \Gamma(G)$, $x_S = (x_\gamma, \gamma \in S)$, h[S], J[S, S] |
| 2: Parameter: MAXITER,XTOL,t $\in$ [0, 1] |
| 3: Output: Solution $x_S^* = (x_\gamma^*, \gamma \in S)$ of the convex optimization problem |
| $$\min_{x_S} \left\{ \frac{1}{2} x_S^T J[S, S] x_S - (h_S)^T x_S + t \sum_{\gamma \in S} \|W_\gamma x_\gamma\| \right\}$$ |
| 4: $x_S^* = x_S$ |
| 5: for t = 1:MAXITER do |
| 6:    h' = h − J[:, S]$x_S^*$ // Residual Measurement Error |
| 7:    $\Delta$ = 0.0 |
| 8:    for $\gamma \in$ S do |
| 9:       h' = h' + J[:, $\gamma$]$x_\gamma^*$ // Residual excluding this path |
| 10:       // Optimal weights for one path conditioned on all other path weights |
| 11:       Solve for $x_\gamma^* = \arg\min_{x_\gamma} \left\{ \frac{1}{2} x_\gamma^T J[\gamma, \gamma] x_\gamma - (h'_\gamma)^T x_\gamma + t\|W_\gamma x_\gamma\| \right\}$ |
| 12:       $\Delta$ = max($\Delta$, $\|x_\gamma^{(new)} - x_\gamma^{(old)}\|$) // Keep track of largest update |
| 13:       h' = h' − J[:, $\gamma$]$x_\gamma^*$ // Update residual for new path weights |
| 14:    end for |
| 15:    if $\Delta$ < XTOL then |
| 16:       BREAK // Converged to desired solution accuracy |
| 17:    end if |
| 18: end for |
| 19: RETURN $x_S^*$ |

Subspace Pursuit Approach

In the previous section, an iterative procedure to optimize a set of paths was discussed. In some embodiments, such as for some dynamical models (e.g., constant-velocity targets), the number of paths may be tractable to enumerate, and this may provide an efficient approach to solve the joint convex optimization problem. However, for maneuverable/agile targets, the graph G=(V,E) may have exponentially growing number of paths with the number of target frames. In this case, it may not be feasible to simply enumerate all paths or to iteratively optimize one path at a time to discover the sparse solution. Fortunately, in some embodiments, the sparsity prior may be leveraged to obtain a solution. In some embodiments, it is known that the solution may lie in a sparse subspace, i.e., with most paths set to zero. Thus, an active subspace may be sought that contains the support of this optimal sparse solution. Over any subset of paths, the group-shrinkage method may be efficiently iterated to converge to the optimal solution within this subspace. In some embodiments, an efficient method to find the next-best path to include in the subspace optimization may be needed. In some embodiments, a method to decide when the globally optimal solution has been obtained (i.e., no more paths are needed) may be desired. In some embodiments, the Viterbi algorithm may provide this solution. As provided above, the solution to the subproblem may be non-zero if and only if $\|W_\gamma^{-T} A_\gamma^T R^{-1} y'_\gamma\|^2 > 1$. Hence, the path to maximize this detection statistic for residual error $y'_S = y - A_S x^*_S$ may be sought, where $x^*_S$ is the optimal solution over subspace S (e.g., computed using the iterative group coordinate descent method), as given by Equation (16) below:

$$\gamma^* = \arg \max_{\gamma \in \Gamma(G)} \mu(\gamma) \qquad (16)$$

where $$\mu(\gamma) = \|W_\gamma^{-T} A_\gamma^T R^{-1} y'_S\|^2 \qquad (17)$$

In some embodiments, it may be assumed that diagonal regularization matrices WY and all paths have consistent node regularization, i.e., $(W_\gamma)_{\nu\nu} = w_\nu$ for all $\nu \in \gamma$ with node regularization parameters $w_\nu$. Then, the path weight may decompose as a sum of node weights (such as provided in Equations (18)-(20), below):

$$\mu(\gamma) = \|W_\gamma^{-T} A^T R^{-1} y'_S\|^2 \qquad (18)$$

$$= \sum_{\nu \in \gamma} (w_\nu^{-1} a_\nu^T R^{-1} y'_S)^2 \qquad (19)$$

$$= \sum_{\nu \in \gamma} \mu_\nu \qquad (20)$$

Thus, the combinatorial optimization problem of finding the maximum-weight path through a graph may be given by Equation (21), below:

$$\max_{\gamma \in \Gamma(G)} \sum_{\nu \in \gamma} \mu_\nu \qquad (21)$$

where $$\mu_\nu = (w_\nu^{-1} a_\nu^T R^{-1} y'_S)^2 \qquad (22)$$

This may require computing the scaled residual error $R^{-1} y'_S$ (R is diagonal) and performing matched-filter computations $A_f^T R^{-1} y'_S$ per sensor frame. Performing these matched-filter computations may often be the most expensive part of the algorithm and should be highly optimized (e.g., using parallelization and GPU acceleration)—such as for computational ease. Due to the directed acyclic structure of G, this max-weight path problem may then be tractable to solve using a Viterbi algorithm. The computational complexity of this algorithm may be linear in the number of directed edges |E| of the graph G. Moreover, the algorithm may be highly parallelizable and amenable to GPU acceleration. Having solved this problem, if the maximum-weight path is found to have weight less than one, it may be certified there are no more detections and that x*(S) is in fact the globally optimal solution x*(Γ). If the weight of the path is greater than one, this path may be added to S and re-solve for the updated solution x*(S) over this expanded subspace. In some embodiments, this search may be warm-started using the previously computed solution and then refined using the iterative group-coordinate descent method. In some embodiments, once a path γ∈S has been included and optimized with respect to $x_\gamma$, then the path may have $\mu(\gamma)<1$ as the target's estimated signal contribution has then been removed from $y'_S$. Thus, in some embodiments, already-detected paths will be suppressed in this search and allow identification of new paths. This process may be repeated until no more paths are detected, and the algorithm terminates with the globally optimal solution. If the total number of detected paths is small, this procedure may be an efficient approach to find the optimal set of target detections.

In some embodiments, the details of the general approach may be specified by Algorithm 4, which may identify a sparse solution of the global optimization seen on Line 3, by solution of sequence of smaller problems defined in adaptively identified subspaces as seen on Line 13. Any convex optimization method may be used to solve the subproblem. In the previous section, several viable approaches utilizing path-wise group coordinate descent and efficient group shrinkage operator were proposed, which may be used in some embodiments. Algorithm 4 additionally may require a combinatorial solver to find the maximum-weight path to add at each step. As discussed above, for Markov dynamics defined on a graph this may be efficiently solved using the well-known Viterbi algorithm (also known as dynamic programming or the max-sum algorithm in different contexts).

---

Algorithm 4 Subspace Pursuit

1: Input: h, J, W, G
2: Parameter: t ∈ [0, 1]
3: Output: Sparse solution S ⊂ Γ(G), $x_S^* = \{x_\gamma^*, \gamma \in S\}$ of the optimization problem $$\min_{x_\Gamma} \left\{ \frac{1}{2} x_\Gamma^T J x_\Gamma - h^T x_\Gamma + t \sum_{\gamma \in \Gamma} \|W_\gamma x_\gamma\| \right\}$$

4: S = ∅
5: while TRUE do
6:   // Subspace Expansion
7:   h' = h − J[:, S]$x_S$ // Residual information
8:   Solve $\gamma^* = \mathrm{argmax}_{\gamma \in \Gamma(G)} \|W_\gamma^{-T} h'_\gamma\|^2$
9:   if $\|W_{\gamma^*}^{-T} h'_{\gamma^*}\| < t$ then
10:    RETURN S, $x_S$
11:   else
12:    S → S ∪ {γ*}
13:
   Solve $x_S^* = \arg\min_{x_S}\left\{\frac{1}{2} x_S^T J[S, S] x_S - (h'[S])^T x_S + t \sum_{\gamma \in S} \|W_\gamma x_\gamma\|\right\}$ 14:   end if
15: end while
16: RETURN S, $x_S^*$

---

In some embodiments, Algorithm 4 may converge to the global solution of the convex optimization problem, while for problems with very closely spaced targets it may do so inefficiently, generating many spurious paths along the way that are subsequently set to zero in the sparse convex optimization problem once better paths are added. In Algorithm 5, an enhanced version of the sparse subspace pursuit is presented, which, in some embodiments, may include a further iterative path refinement procedure on the existing set of discrete paths before adding any additional paths. In some embodiments, this enhanced approach may be able to identify the sparse solution more efficiently, i.e., while keeping the size of the subspace small compared to the original method.

---

Algorithm 5 Enhanced Subspace Pursuit (with Iterative Refinement)

1: Input: h, J, W, G
2: Parameter: t ∈ [0, 1]
3: Output: Sparse solution S ⊂ Γ(G), $x_S^* = \{x_\gamma^*, \gamma \in S\}$ of the optimization problem $$\min_{x_\Gamma} \left\{ \frac{1}{2} x_\Gamma^T J x_\Gamma - h^T x_\Gamma + t \sum_{\gamma \in \Gamma} \|W_\gamma x_\gamma\| \right\}$$

| Algorithm 5 Enhanced Subspace Pursuit (with Iterative Refinement) |
|---|
| 4:   S = ∅ |
| 5:   while TRUE do |
| 6:     // Subspace Expansion |
| 7:     h' = h − J[:, S]$x_S$* // Residual information |
| 8:     Solve $\gamma^* = \text{argmax}_{\gamma \in \Gamma(G)} \|W_\gamma^{-T} h_\gamma'\|^2$ |
| 9:     if $\|W_{\gamma^*}^{-T} h_{\gamma^*}'\| < t$ then |
| 10:       RETURN S,$x_S$* |
| 11:     else |
| 12:       S → S ∪ {$\gamma^*$} |
| 13:       Solve $x_S^* = \arg\min_{x_S} \left\{ \frac{1}{2} x_S^T J[S, S] x_S - (h'[S])^T x_S + t \sum_{\gamma \in S} \|W_\gamma x_\gamma\| \right\}$ |
| 14:     end if |
| 15:     // Subspace Refinement |
| 16:     Q = queue(S) |
| 17:     while Q ≠ ∅ do |
| 18:       // Remove one path |
| 19:       γ = pop(Q) |
| 20:       S = S \ γ |
| 21:       h' = h − J[:, S]$x_S$ |
| 22:       // Find best replacement |
| 23:       Solve $\gamma^* = \text{argmax}_{\gamma \in \Gamma(G)} \|W_\gamma^{-T} h_\gamma'\|^2$ |
| 24:       if $\gamma^* = \gamma$ then |
| 25:         S = S ∪ γ // This path is optimal conditioned on all other paths |
| 26:       else |
| 27:         Q = queue(S) // Improved a path - must now reconsider all other paths |
| 28:         S = S ∪ $\gamma^*$ |
| 29:         Solve $x_S^* = \arg\min_{x_S} \left\{ \frac{1}{2} x_S^T J[S, S] x_S - (h'[S])^T x_S + t \sum_{\gamma \in S} \|W_\gamma x_\gamma\| \right\}$ |
| 30:       end if |
| 31:     end while |
| 32:   end while |

In some embodiments, a parameter $t \in [0,1]$ may be included in the subspace pursuit algorithms. The convex solver may correspond to $t=1$. However, in some embodiments, if t is set to $t=0$, this may result in a greedy algorithm that performs optimization over the identified subspaces without any weight on the convex sparsity prior. This may be equivalent to a greedy algorithm attempting to solve a non-convex optimization problem regularized by the number of selected paths to induce sparsity. Selecting values of t between zero and one therefore may attempt to minimize a mixture of the convex and non-convex sparsity priors. As will be explained in reference to the following figures, the convex solver $t=1$ may out-perform the greedy solver $t=0$ due to its ability to identify a global optimum. However, in some embodiments, the method may work well for values of t close to one by exploring fewer paths and selecting sparser solutions. In some embodiments, further improvements may be achieved by using a non-convex continuation method, which begins with the convex objective ($t \approx 1$) and then incrementally change the objective by reducing t to become more and more greedy and polish the solution at each stage to approach a good local minimum of the $t=0$ problem. This approach may enjoy the benefits of the convex optimization method to find a good global solution, but may then polish it to obtain a nearby solution that is locally optimal under the combinatorial sparsity prior.

Computation Examples

To illustrate some embodiments, several simple examples of detecting multiple targets in a 1-D signal are presented in FIGS. 2-7. Both single- and multi-frame examples are provided. In the embodiments depicted in these examples, the target signal is modeled as being blurred by a Gaussian point spread function (PSF), and as having added Gaussian white measurement noise. In the multi-frame examples, the target is moving and is allowed some ability to accelerate. In some examples, stressing cases of closely spaced and crossing targets are considered to highlight the ability of the embodiments to optimally resolve such targets.

In the depicted examples, the convex objective may be of the simplified form:

$$\min_x \left\{ \frac{1}{2} \|y - Ax\|^2 + \lambda \|x\|_{\Gamma,1} \right\} \quad (23)$$

where $\|x\|_{\Gamma,1} = \Sigma_{\gamma \in \Gamma} \|x_\gamma\|$ may be the sum of path-wise norms. In the single-frame case, this may just be the $\ell_1$-norm $\|x\|_1 = \Sigma_i |x_i|$. In some embodiments, this problem formulation may be a special case of the more general convex formulation with R=I and $\Lambda_\gamma = \lambda I$ for all paths γ. In some embodiments, a column-normalized A may be used such that $a_v^T a_v = 1$ for all $v \in V$. Each column of A may be the (normalized) Gaussian point-spread-function in a single frame of data centered on the target's hypothesized position. This may also result in $A_\gamma^T A_\gamma = I$. Thus, the requirement $W_\gamma^T W_\gamma = \rho A^T A$ with $\rho = \lambda^2$ are satisfied. Then, λ may act as detection threshold on the matched filter statistic h=A'y, and the iterative group shrinkage method may be used to solve the problem. In some embodiments, the matched filter computation $A^T y$ may be equivalent to convolution of the signal data with the Gaussian kernel (independently in each data frame). In some embodiments, such computations may be efficiently computing using FFT methods, which also are amenable to parallelization on a GPU.

Greedy Algorithm

In some of the figures, an algorithm according to one or more embodiments is compared to a simple greedy method. The greedy method may operate by iterating the follow single-target detection process:
1. Optimally detect a single target maximizing the matched filter score.
2. Compare the maximum match filter score to a detection threshold and accepting the detection only if it is above threshold. Otherwise, the detection process is terminated at this step.
3. Estimate the target signal to minimize the mean-squared error and remove the estimated target signal to form a residual signal.
4. Iterating this process on the residual signal to detect further targets until the detection threshold is not met.

This procedure may be interpreted as a greedy algorithm attempting to optimize the non-convex objective below:

$$\min_x \left\{ \frac{1}{2} \|y - Ax\|^2 + \lambda \|x\|_{\Gamma,0} \right\} \quad (24)$$

where a combinatorial sparsity prior $\|x\|_{\Gamma,0}$ may represent the number of paths with non-zero values. In the single-frame case, this may just be the $$\ell_0\text{-norm } \|x\|_0 = \lim_{p \to 0} \|x\|_p$$

equal to the number of non-zero elements of x. The greedy method may add one path at a time, always selecting the next path as the one that gives the greatest reduction of the quadratic error, and it may stop when the error reduction is less than $\lambda$ and therefore a net degradation when including the combinatorial sparsity prior. Because the objective is non-convex, this greedy procedure may converge to a local minimum, but it may not find the best global solution. The greedy method above may be similar to prior approaches for track-before-detect, which may produce a baseline for comparison. In some embodiments, the greedy method may also be similar to Algorithm 4 with parameter t=0. In some embodiments, Algorithm 4 may jointly optimize over all detected paths, rather than only the most recently detected path as in the simple greedy method.

In the example figures, both the convex optimization and greedy search may use the same detection threshold $\lambda$ on the matched filter statistics, so that they have the same false alarm rate, and this threshold is large enough so that low false alarms rates are expected in all the following examples.

Single Frame Detection

The figures show examples of simpler case of detecting targets in a 1-D signal and for a single frame of data. Three illustrative test cases are seen respectively in FIG. 2-4:

Four Separable Targets. First, as a baseline FIG. 2 is provided as an example of four well-separated targets (e.g., the target trajectories stay far enough apart at all times so that the overlap of their PSFs is negligible). In this regime, the convex and non-convex optimization problems may be essentially separable into independent problems and may be expected to generate the same detections within this regime. As depicted in FIGS. 2D-2F, it can be observed that the first three targets are bright enough (relative to the detection threshold) to be detected, but the dimmest target is not detected. Lowering the detection threshold to detect the dimmest targets may generate false-alarms due to the noise threshold.

Figure 2A:
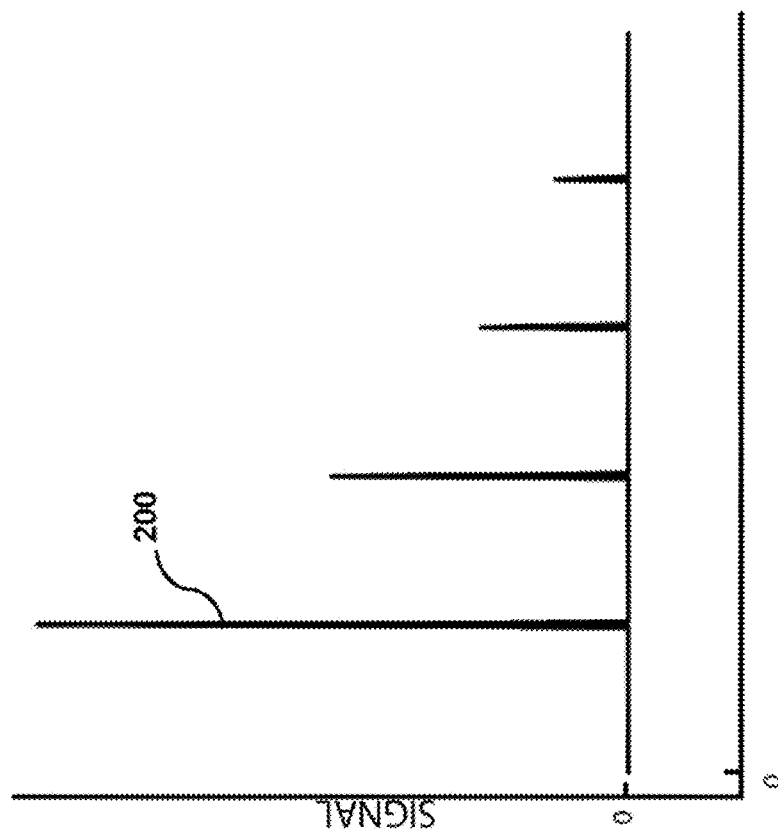
Figure 2D:
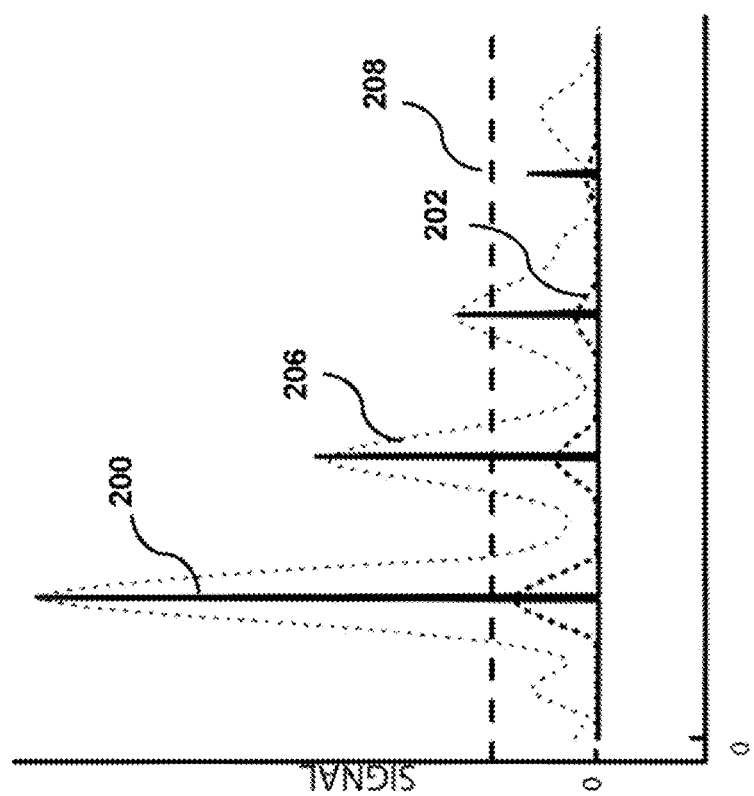
Figure 2C:
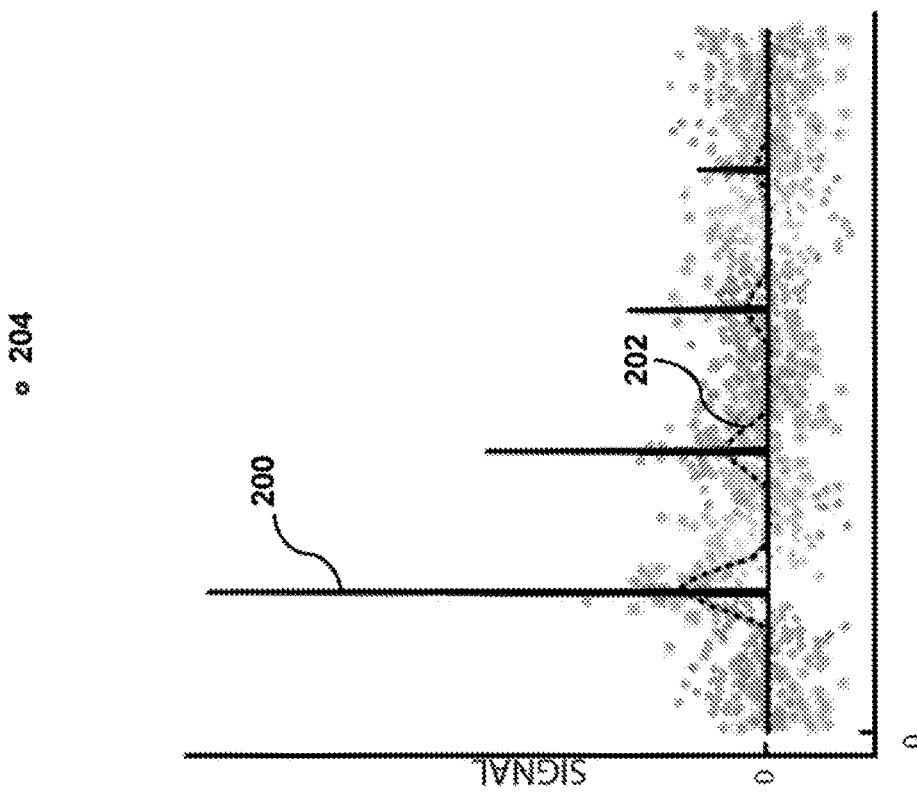
Figure 2F:
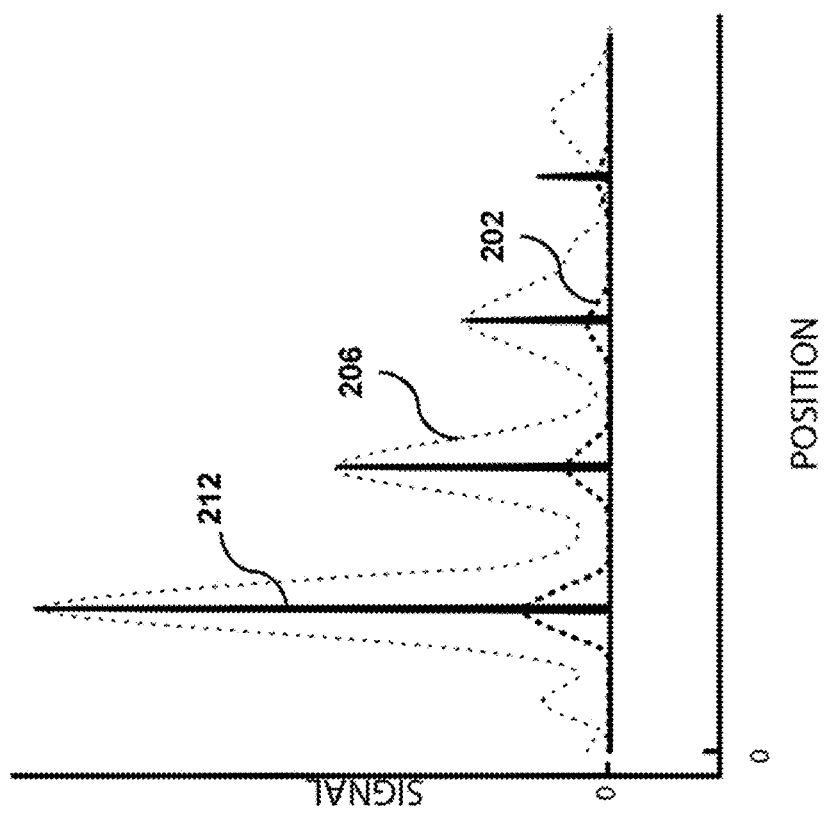
Figure 2E:
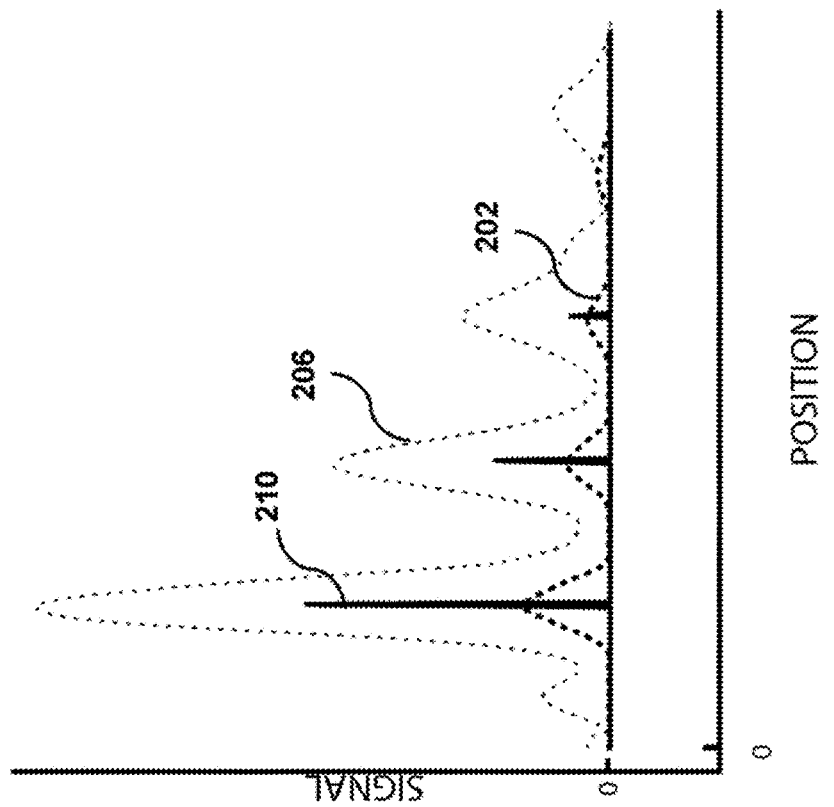

FIGS. 2A-2F are graphs depicting example target signals and detection operations in one-dimension for four well-separated targets with varying intensity. FIG. 2A depicts target locations and total signal strength, in target signal 200, for the example targets. FIG. 2B depicts target signal 200 convolved with point-spread-function (e.g., as received signal 202), which may represent an example signal as detected by an example sensor. FIG. 2C depicts the target signal 202 of FIG. 2B plus Gaussian white noise (e.g., a measured signal 204), which may represent an example signal and noise as detected by an example sensor. FIG. 2D depicts matched filter statistics (e.g., as matched filter signal 206) and detection threshold 208, for the example signals of FIG. 2C. FIG. 2E depicts convex optimization detection 210, which detects the three brightest objects. FIG. 2F depicts greedy detection 212, which also detects the three brightest objects.

Closely Spaced Targets with Varying Separation. Next, in FIG. 3, a more difficult case (e.g., than that shown in FIG. 2) including three pairs of closely spaced targets is considered. Here, all targets have the same brightness sufficient to be individually detectable. In the examples depicted, the convex optimization method is able to resolve the closely spaced targets in the first and second case, even though both the signal and matched filter are uni-modal in the second case, but then generates a single merged detection in the case of the closest third pair that looks very similar to a single Gaussian. The greedy method only resolves the first pair with the highest separation, sufficient to produce a bi-modal matched filter response and generates merged detections on the second and third closer pairs both having uni-modal matched filter response. Thus, the convex method is able to resolve closer targets than the greedy method, including at any given level of target brightness. The greedy method fails to resolve dim targets once the matched filter response is uni-modal. The second case is an example of the local search becoming trapped by a spurious local minimum, created by utilization of the non-convex combinatorial sparsity prior. Utilizing a convex sparsity prior, spurious local minima may be eliminated and a global solution found that better explains the data.

Figure 3B:
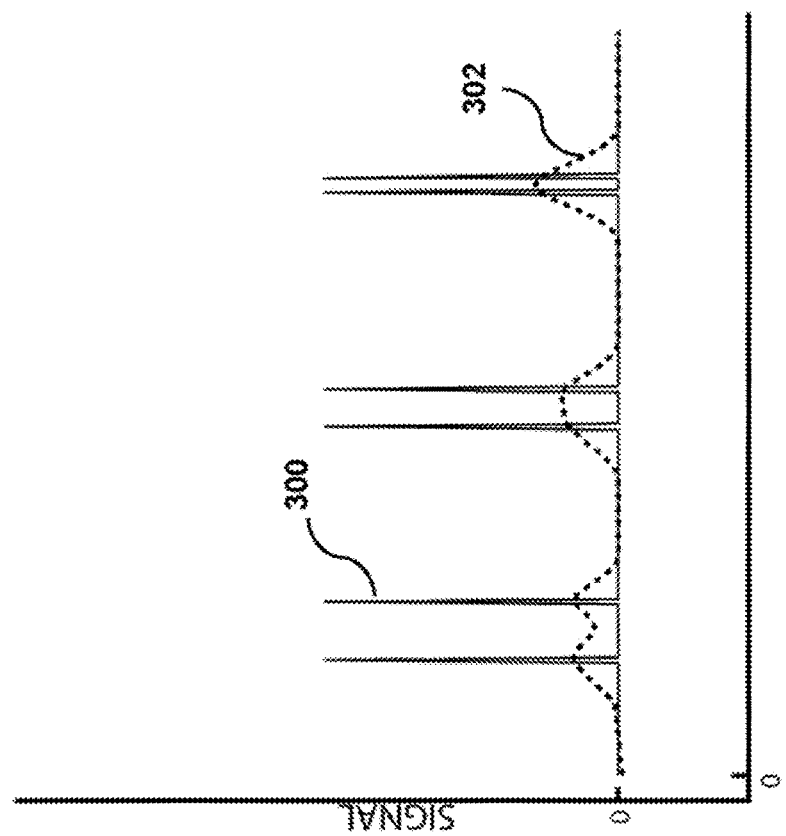
FIGS. 3A-3F are graphs depicting example target signals and detection operations in one-dimension for six targets grouped into three closely spaced pairs with fixed target brightness and varying target separation, in accordance with one or more embodiment.
Figure 3A:
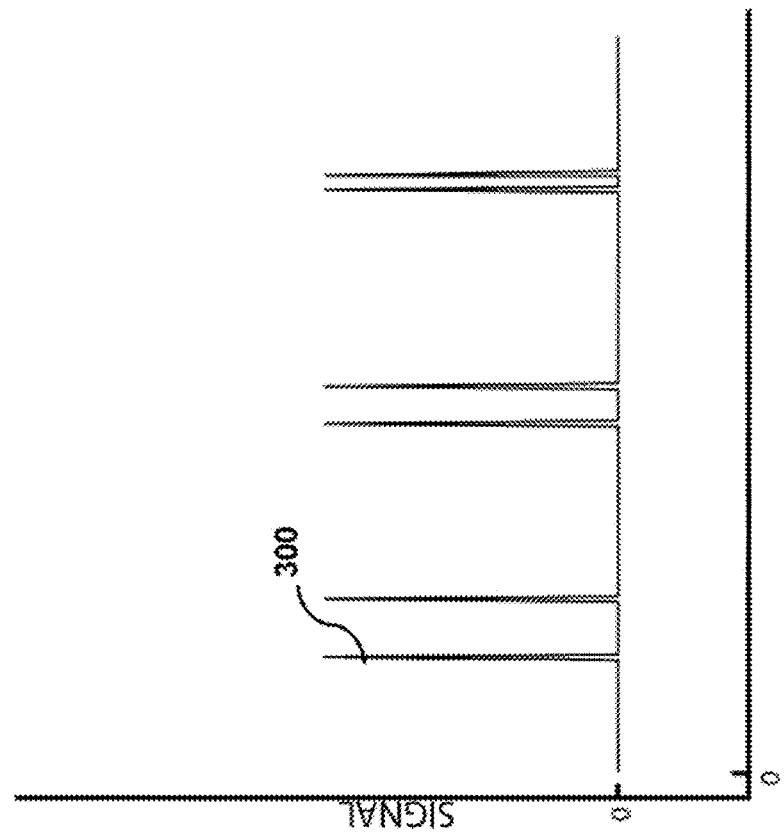
Figure 3D:
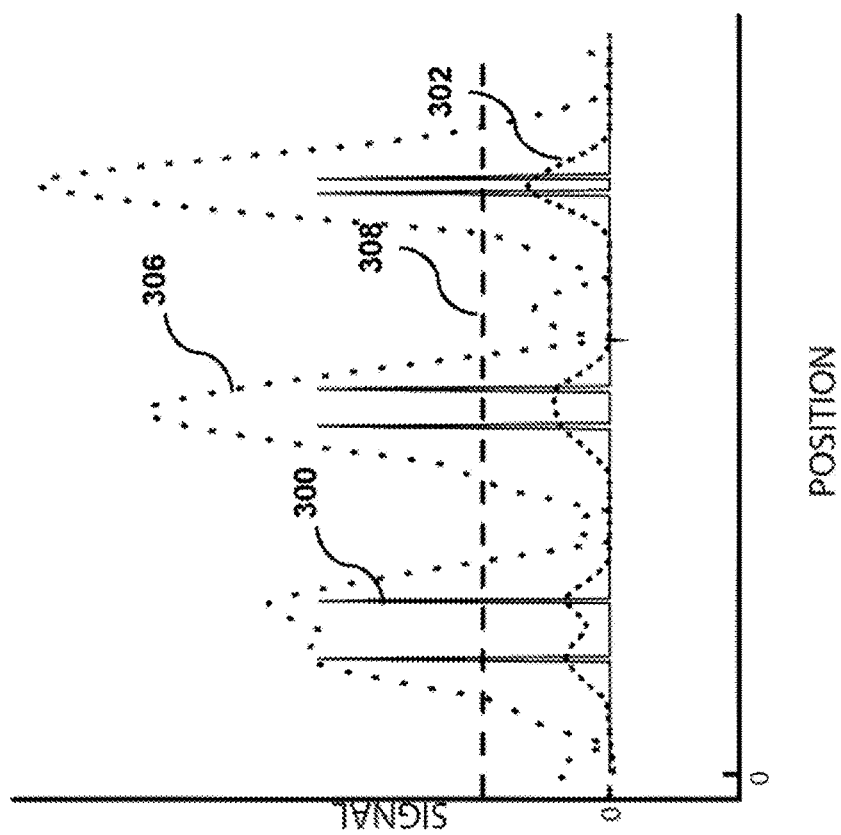
Figure 3C:
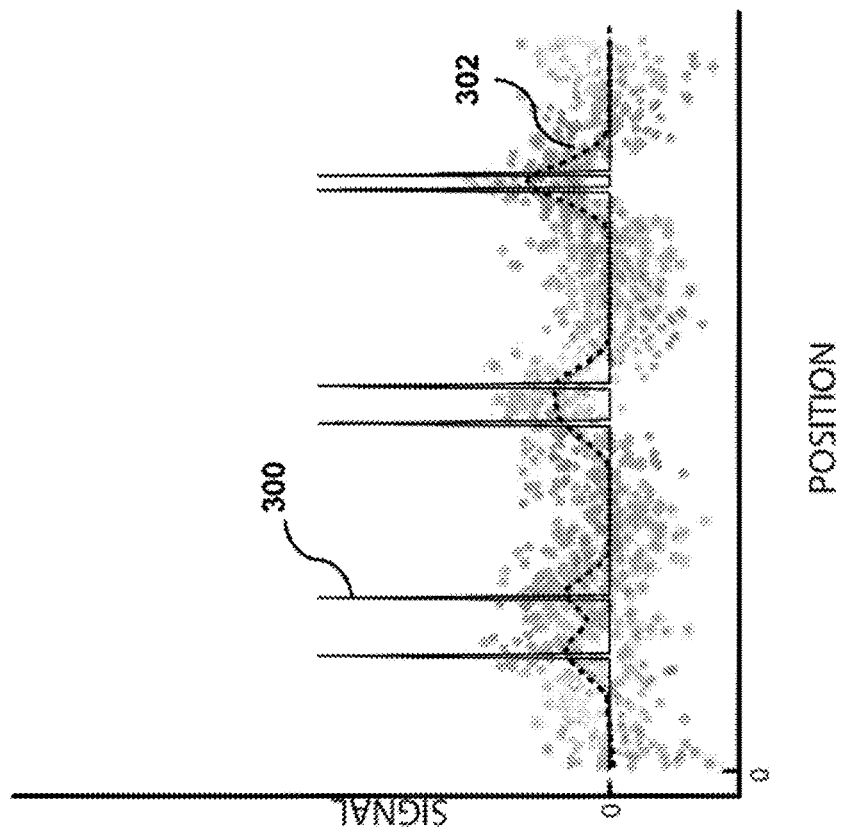
Figure 3F:
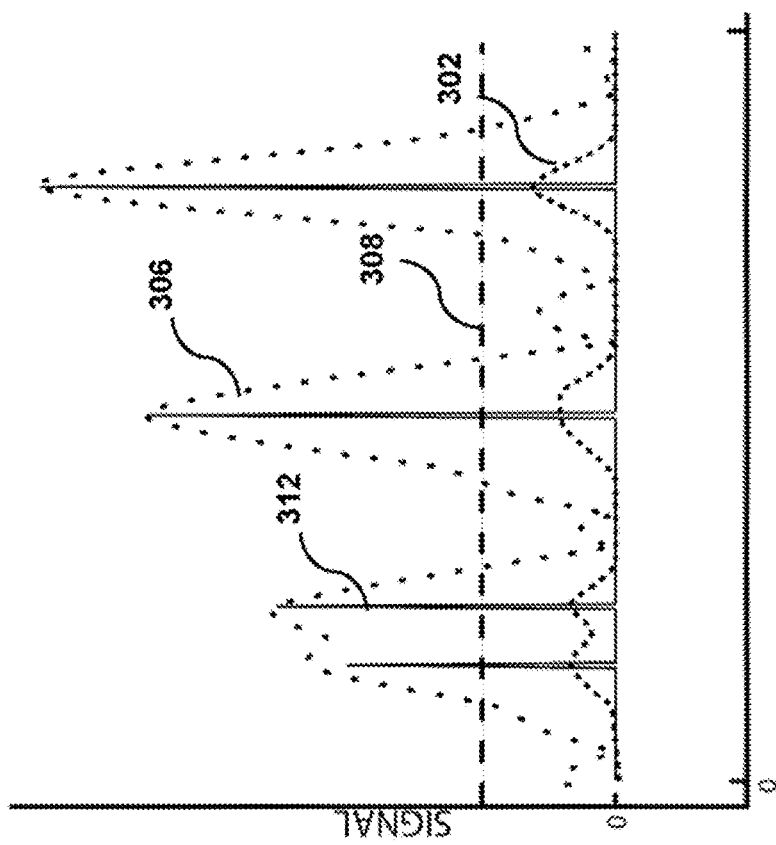
Figure 3E:
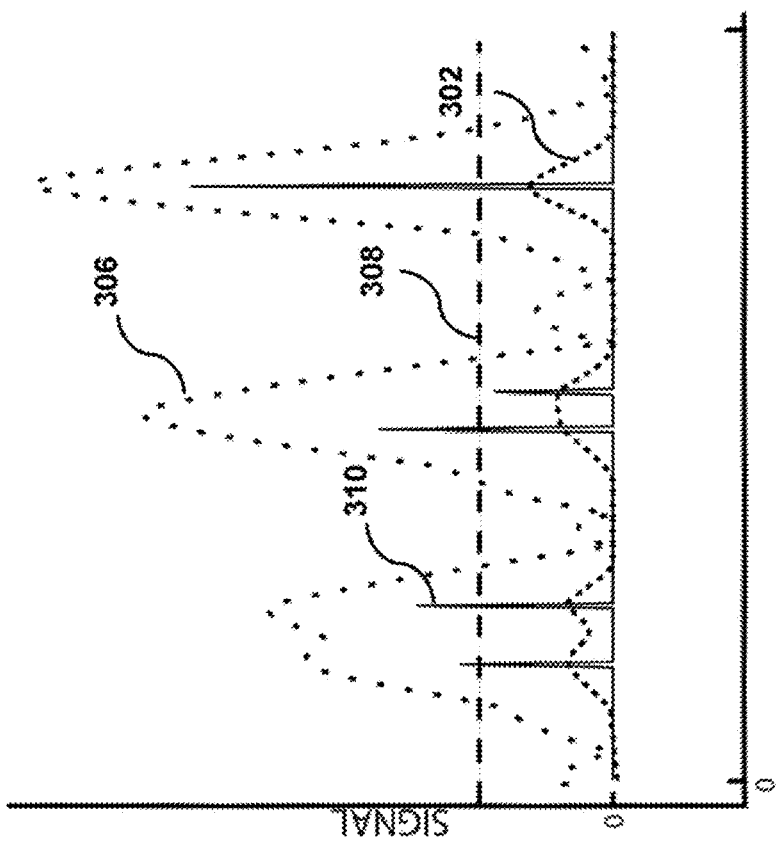

FIGS. 3A-3F are graphs depicting example target signals and detection operations in one-dimension for six targets grouped into three closely spaced pairs with fixed target brightness and varying target separation. FIG. 3A depicts target locations and total signal strength, in target signal 300. FIG. 3B depicts target signal 300 convolved with point-spread-function (e.g., as received signal 302). FIG. 3C depicts target signal 302 of FIG. 3B plus Gaussian white noise (e.g., a measured signal 304). FIG. 3D depicts matched filter statistics (e.g., as matched filter signal 306) and detection threshold 308. FIG. 3E depicts convex optimization detection 310, which detects the four objects representing the two most distantly spaces pairs and detects as a single object the most closely spaced pair of objects. FIG. 3F depicts greedy detection 312, which detects both of the most distantly spaced objects, but detects each of the more closely spaced pairs as a single object.

Closely Spaced Targets with Varying Brightness. Finally, in FIG. 4, another example including three pairs of closely spaced targets is considered. Here, all three pairs are fixed to have the same separation, but the target brightness varies within each pair. In the example depicted, the convex optimization method is able to resolve the closely spaced targets in the first and second cases with brighter targets but generates a merged detection in the case of the third pair. We generally observe that the convex method is able to resolve a closely spaced pair if the targets are sufficiently bright. The greedy method again generates merged detections on the two dimmest pairs of closely spaced targets, but now generates redundant detections on the first brightest pair of closely spaced targets. Increasing the target brightness does not result in correct detections in the greedy approach, but rather causes redundant detections with poor position estimates. This is due to the greedy approach, which commits to early decisions of the search and does not reconsider those decisions given later additional detections. The first case is another example of the local search becoming trapped by a spurious local minimum, created by utilization of the non-convex combinatorial sparsity prior. In some embodiments, by utilizing a convex sparsity prior, spurious local minima are eliminated, and a global solution may be found that better explains the data.

Figure 4B:
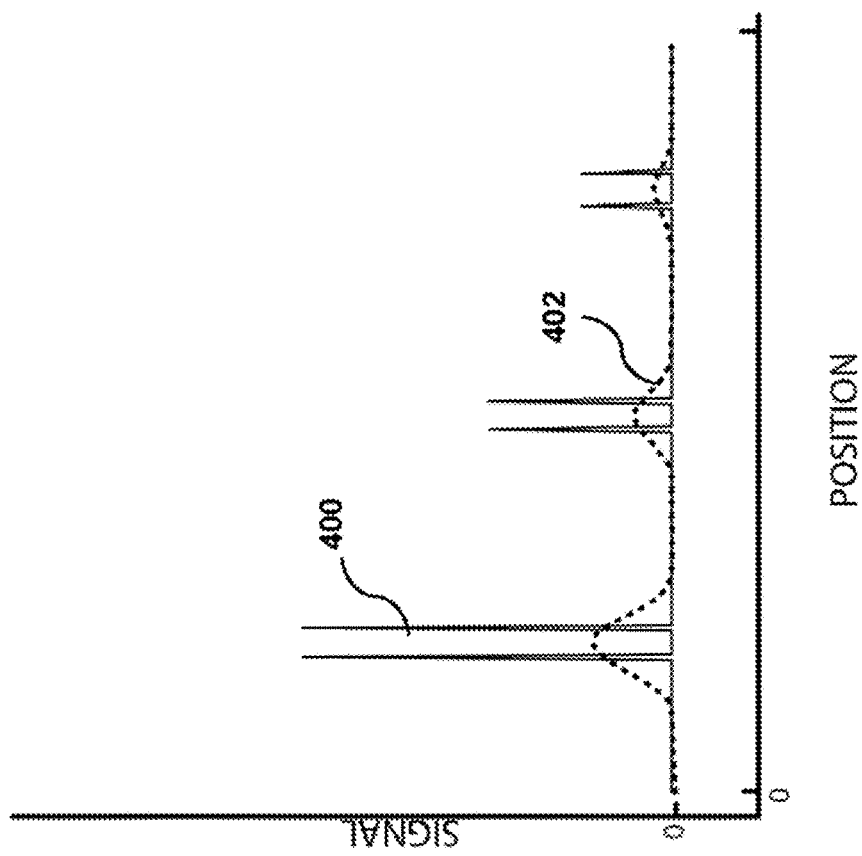
FIGS. 4A-4F are graphs depicting example target signals and detection operations in one-dimension for six targets grouped into three closely spaced pairs with fixed separation and varying target brightness, in accordance with one or more embodiment.
Figure 4A:
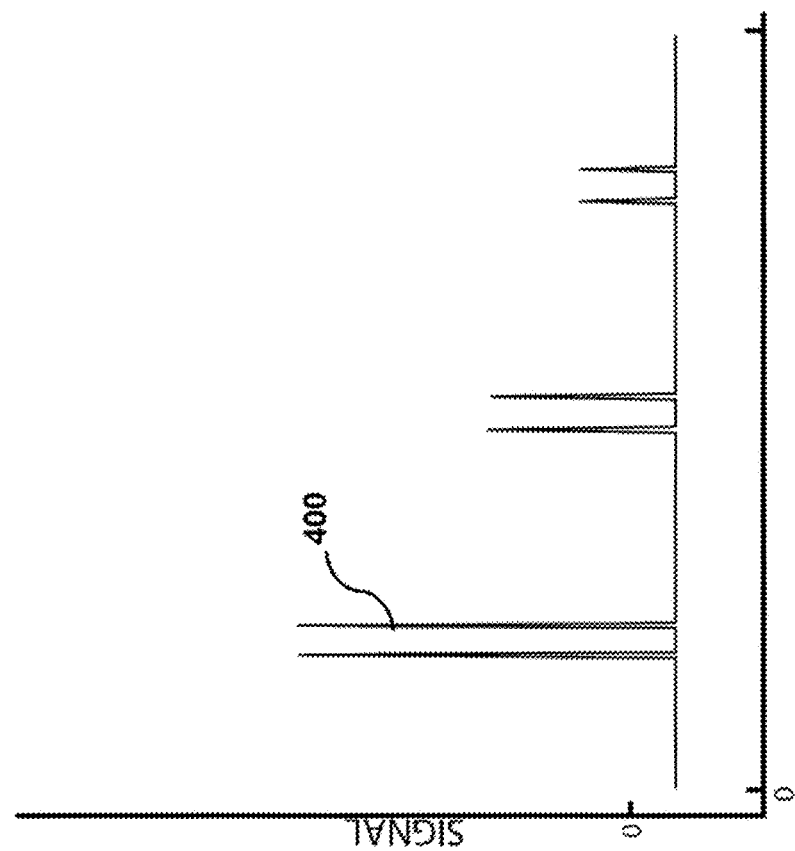
Figure 4D:
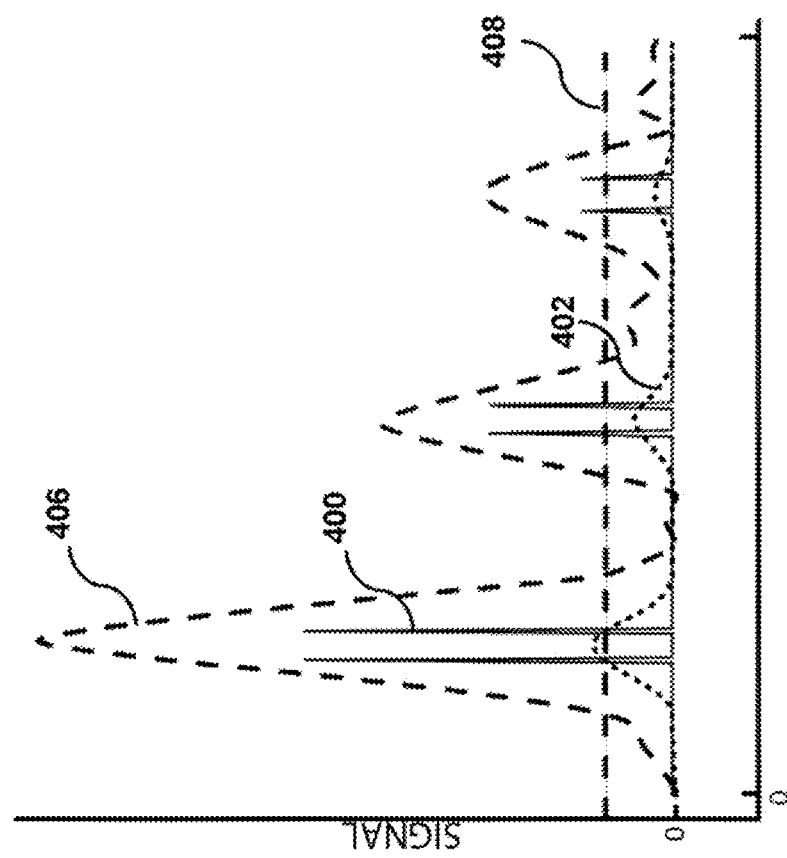
Figure 4C:
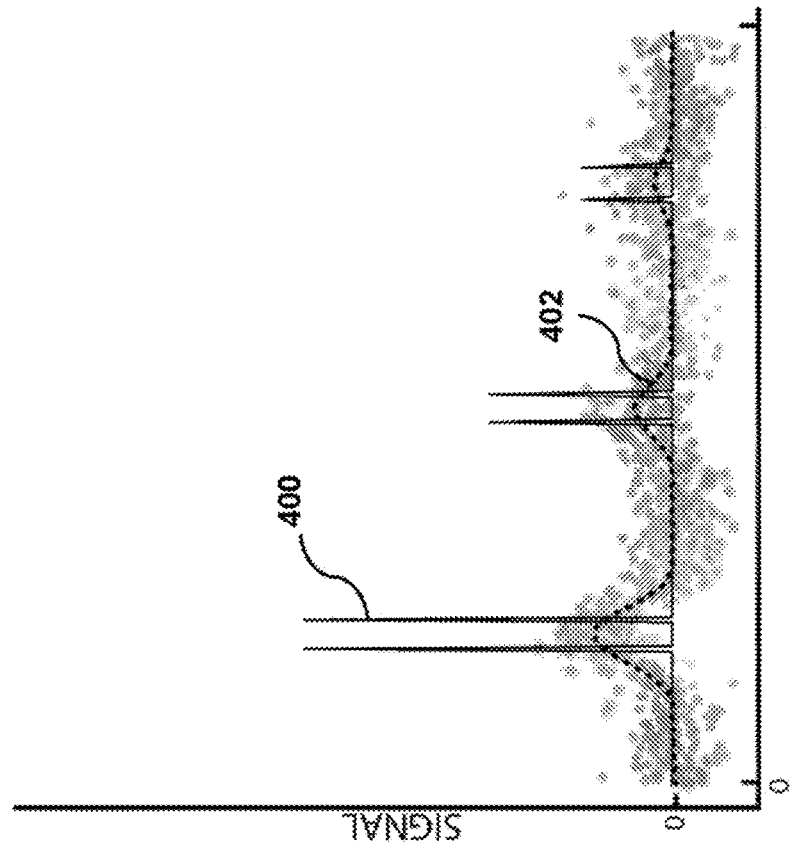
Figure 4F:
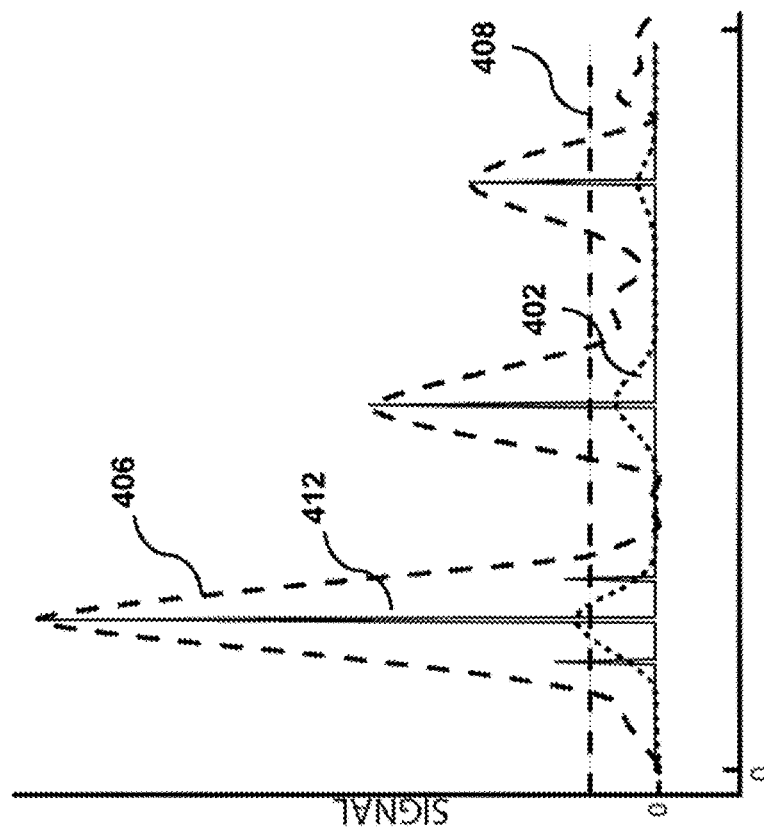
Figure 4E:
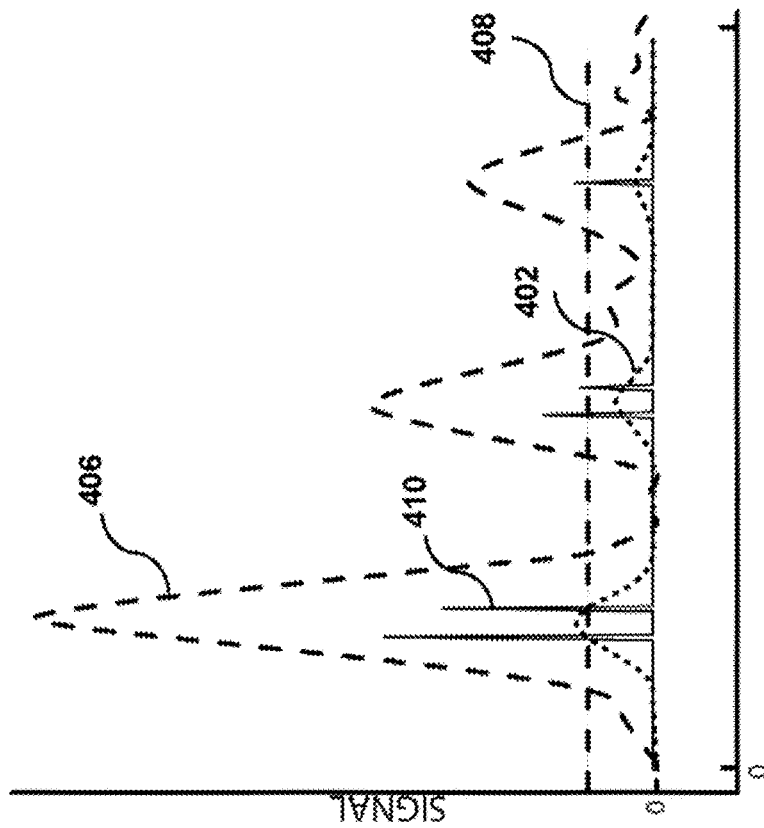

FIGS. 4A-4F are graphs depicting example target signals and detection operations in one-dimension for six targets grouped into three closely spaced pairs with fixed separation and varying target brightness. FIG. 4A depicts target locations and total signal strength, in target signal 400. FIG. 4B depicts target signal 400 convolved with point-spread-function (e.g., as received signal 402). FIG. 4C depicts target signal 402 of FIG. 4BA plus Gaussian white noise (e.g., a measured signal 404). FIG. 4D depicts matched filter statistics (e.g., as matched filter signal 406) and detection threshold 408. FIG. 4E depicts convex optimization detection 410, which detects both of the objects of the brightest pairs and resolves the dimmest pair as a single object. FIG. 4F depicts greedy detection 412, which detects a single object for each of the dimmest pairs and resolves a triplet of objects for the brightest pair of objects.

Multi-Frame Detection

In the next figures, more complex cases (e.g., than in the preceding figures) are considered, such as where multiple frames of data (e.g., across time) are observed and where the target may move over time. Here, the case of a target that executes nearly constant velocity over time so that the motion across times is correlated by a slowly varying velocity is considered. In this setting, determining a path in position space to maximize a squared norm $\|h_\gamma\|^2 \triangleq \Sigma_t |h_{t,\gamma_t}|^2$ may be efficiently computed with the aid of the Viterbi (dynamic programming) method to find the maximum-weight path in an augmented graph of joint position-velocity hypotheses in each time frame and where arcs connect nodes of consecutive frames that are feasible under the allowed target dynamics. This may require discretizing the position-velocity space within each frame. Thus, the Viterbi algorithm operative over a 3-D graph (not shown in the examples, which present a 2-D graphical representation, but understandable by extension) indexed by position, velocity, and time. The rest of the algorithm may then operate on the 2-D space indexed by position and time. The weight of each node may be the squared match-filter score of the node (that may only depend on position in this example), thus the threshold for the path weight may be $\lambda^2$.

Three illustrative test cases are seen respectively in FIGS. 5-7:

Four Separable Targets. First, as a baseline FIG. 5 is provided as an example of four well-separated targets (i.e., the target trajectories stay far enough apart at all times, so the overlap of their PSFs is negligible). In this regime, the convex and non-convex optimization problems may be essentially separable into independent problems. Targets having SNRs of 4.0, 3.0, 2.0, and 1.0, respectively, are considered to examine detection as a function of brightness. These four targets may have small random accelerations (e.g., randomly sampled within the modelled level of target maneuverability). In such cases, both the convex and greedy optimization method may succeed to detect those targets that are bright enough to exceed the detection threshold (i.e., with no redundant or impure detections and no false alarms in this example). In fact, the two methods may be expected to detect exactly the same targets with the same trajectory estimates in this regime, and it is expected that this detection may be the globally optimal solution of the non-convex problem, which is really the ideal solution. The results of this case are seen in FIG. 5. It may be noted that while the brightest target may be visually apparent in the noisy measurement (at least to a human eye looking across time), such as in FIG. 5B, the dimmer targets may be very hard to see (e.g., with respect to noise). When taking per-frame matched filter statistics, the target energy is more apparent (on average across time), such as in FIG. 5C, but the dimmest target is well within the level of noise variation. Thus, it is reasonable for a well-chosen detection threshold that the dimmest target (with an SNR of 1.0) may not be detectable (i.e., without generating excessive false alarms on noise).

Figure 5B:
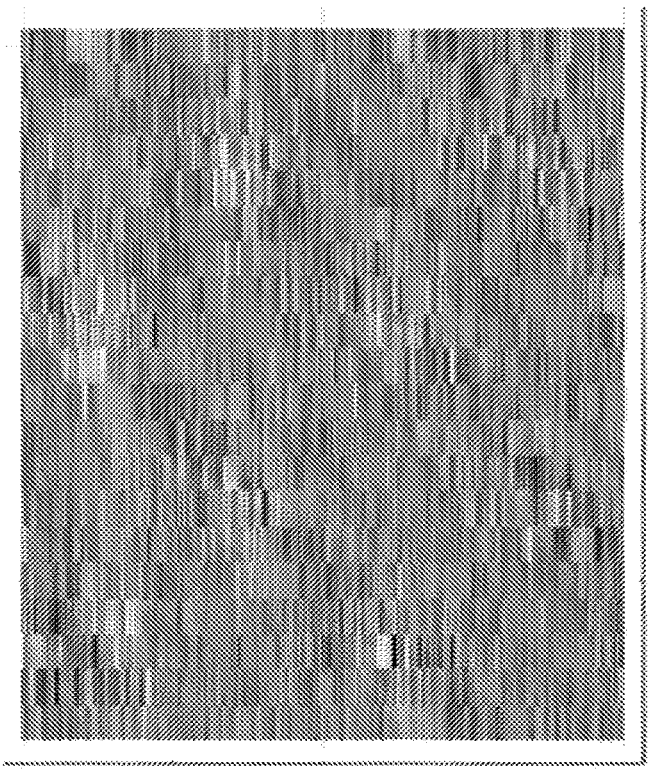
Figure 5A:
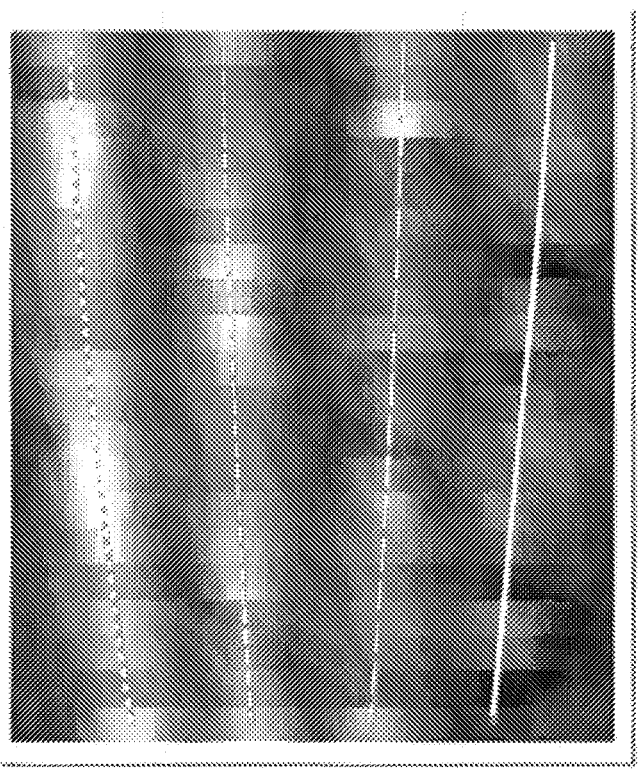
Figure 5D:
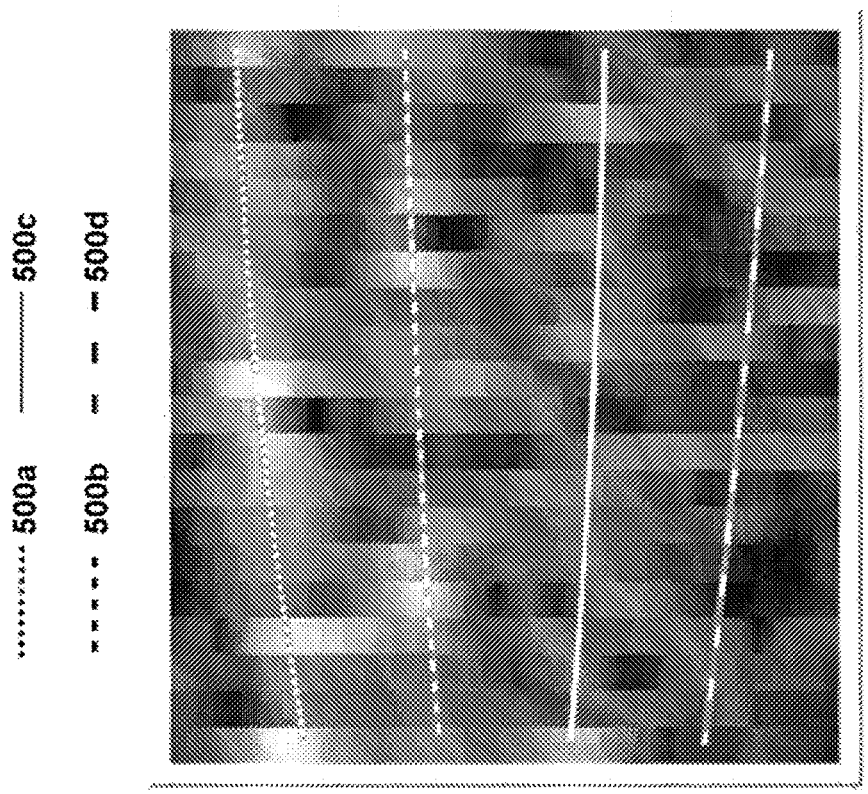
Figure 5C:
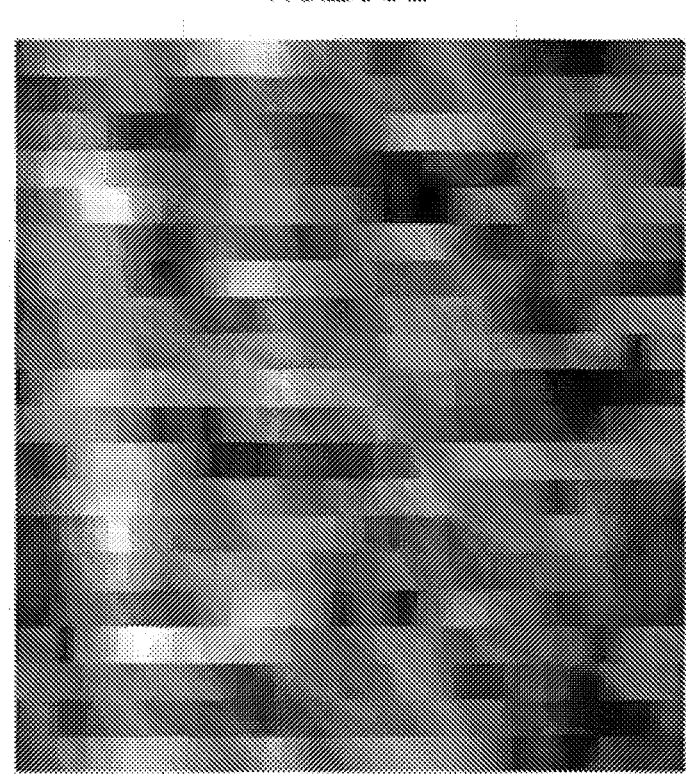
Figures 5E, 5F:
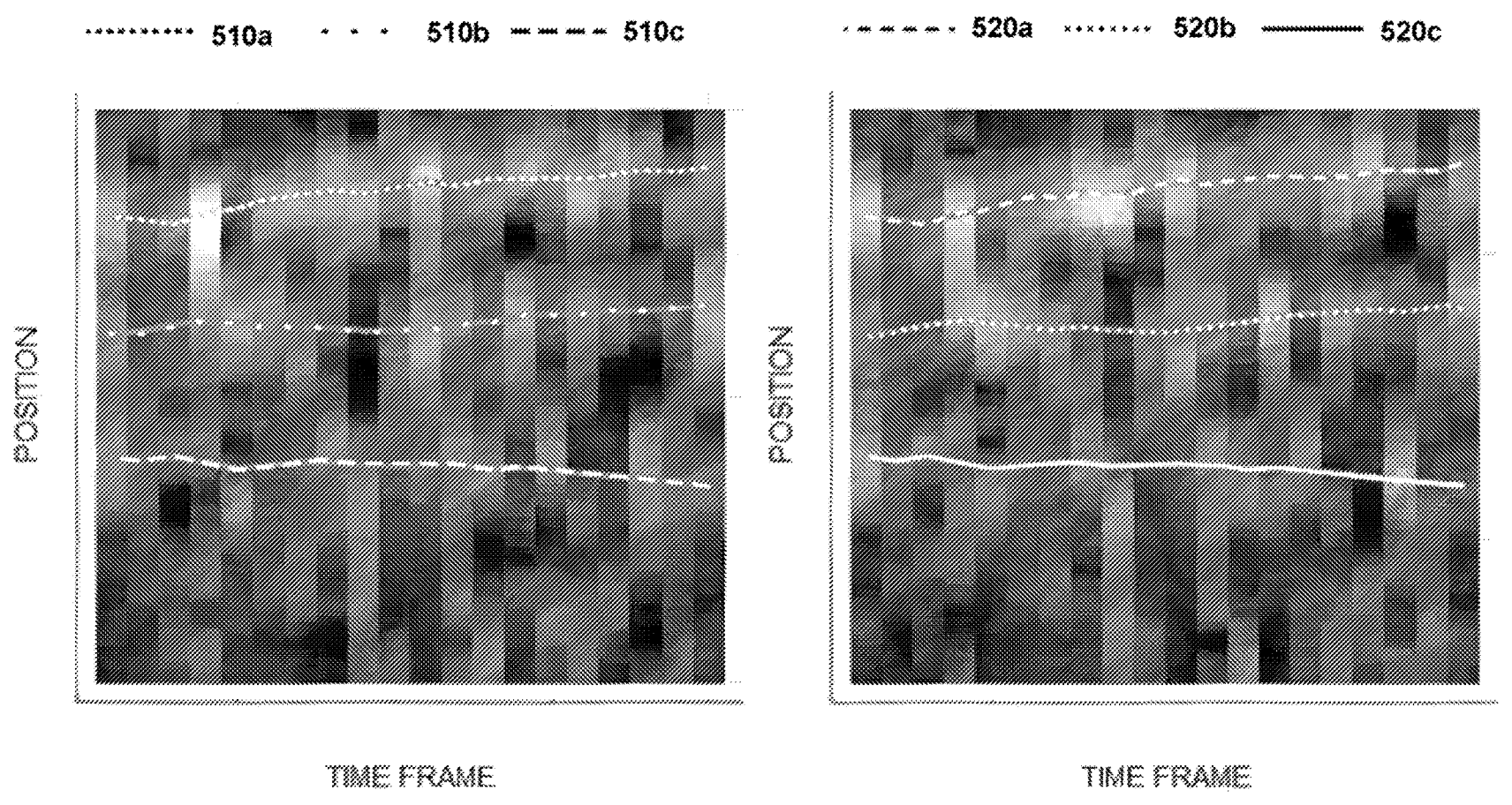

FIGS. 5A-5F are graphs depicting example target signals and detection operations in multiple frames of data for four well-separated targets with varying intensity. FIG. 5A depicts target signals with true target trajectories 500a, 500b, 500c, and 500d overlaid. FIG. 5B depicts target signal in noise. FIG. 5C depicts per-frame matched filter detection statistics. FIG. 5D depicts matched filter statistics with true target trajectories 500a, 500b, 500c, and 500d overlaid. FIG. 5E depicts convex optimization detections 510a, 510b, and 510c. FIG. 5F depicts greedy detections 520a, 520b, and 520c.

Two Closely Spaced Targets on Parallel Trajectories. In FIG. 6, two equally bright targets are brought close together and then move along essentially parallel constant velocity trajectories (the true target accelerations have been set to zero here, but the algorithms still search over the larger space of maneuvering target trajectories). Here, the two targets together are just barely visible in the observations (e.g., in FIG. 6B), but more readily seen in the image of matched filter statistics (e.g., in FIG. 6C). However, they are so close that the energy appears merged in the image (e.g., there is essentially no cases of a clear bi-modal distribution). Nonetheless, solution of the global convex optimization correctly resolves and detects both targets (e.g., in FIG. 6E). Here, the greedy method, in FIG. 6F, only provides a single merged detection, and thus has under-estimated the number of targets and given an impure detection that is not the best estimate of either target's true trajectory. Thus, it is observed that the convex method is better able to resolve dim, closely spaced targets, where the greedy method will produce merged detections whenever the matched filter score is unimodal. This is an example of the local search becoming trapped by a spurious local minimum, created by utilization of the non-convex combinatorial sparsity prior. Utilizing a convex sparsity prior, a spurious local minima may be eliminated and a global solution found that better explains the data.

Figures 6A, 6B:
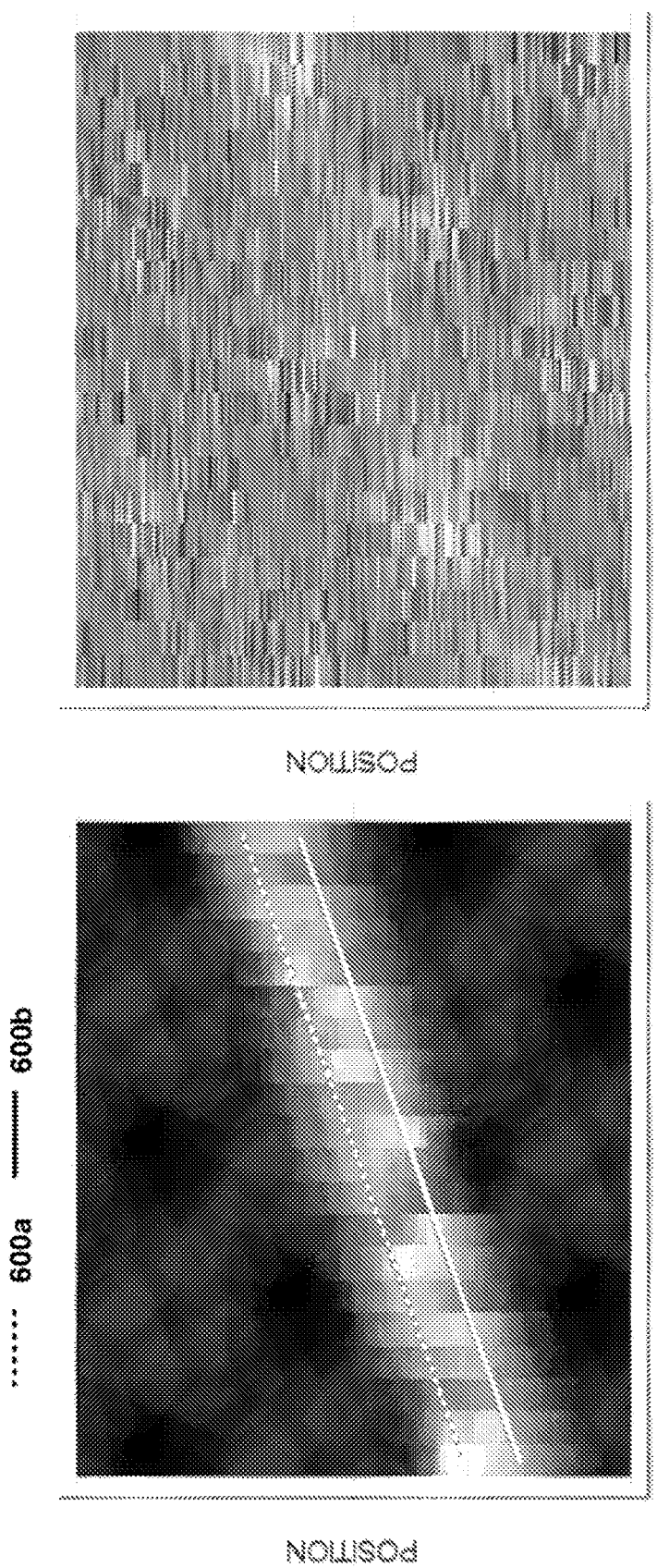
FIGS. 6A-6F are graphs depicting example target signals and detection operations in multiple frames of data for two closely spaced targets with parallel trajectories, in accordance with one or more embodiment.
Figure 6D:
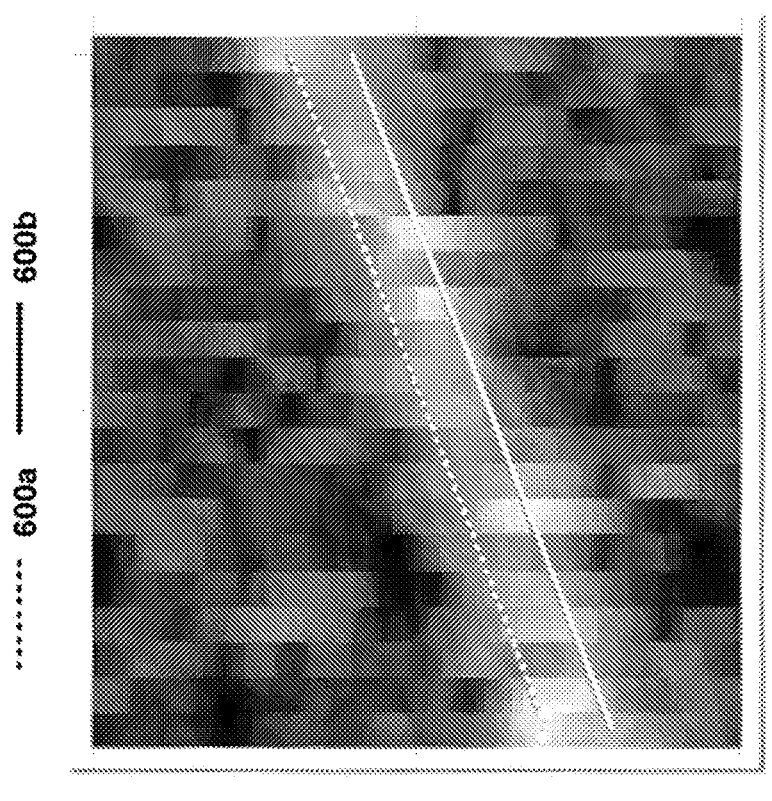
Figure 6C:
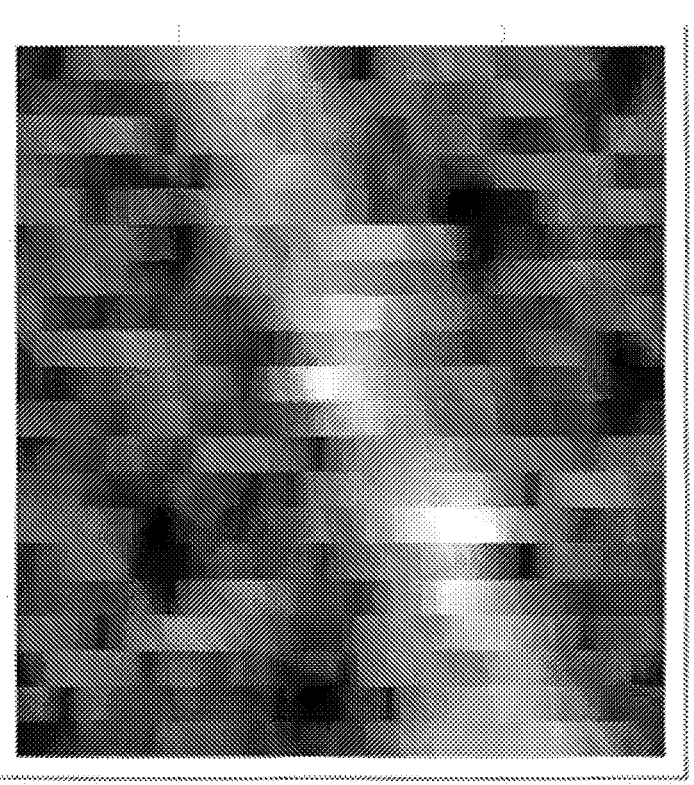

FIGS. 6A-6F are graphs depicting example target signals and detection operations in multiple frames of data for two closely spaced targets with parallel trajectories. FIG. 6A depicts target signal with true target trajectories 600a and 600b overlaid. FIG. 6B depicts target signal in noise. FIG. 6C depicts per-frame matched filter detection statistics. FIG.

Figure 6F:
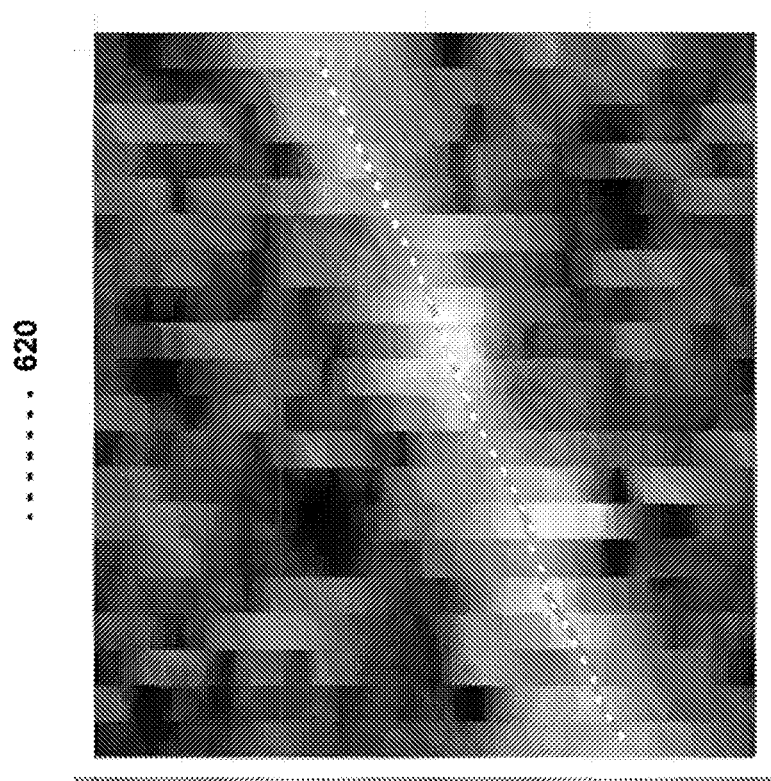
Figure 6E:
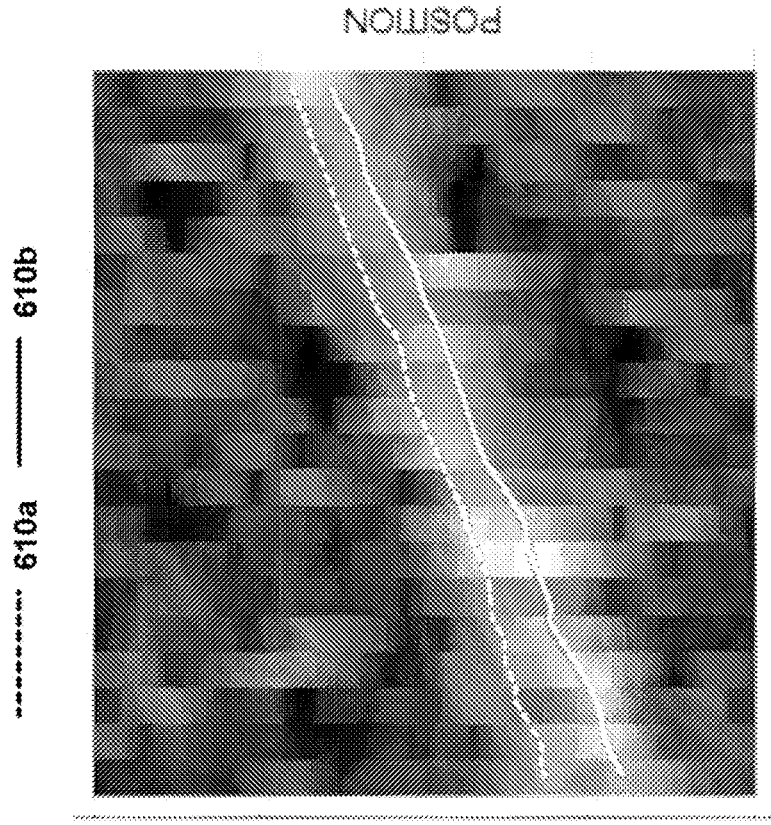

6D depicts matched filter statistics with true target trajectories 600a and 600b overlaid. FIG. 6E depicts convex optimization detections 610a and 610b. FIG. 6F depicts greedy detection 620.

Two Crossing Targets. Lastly, in FIG. 7, is another example of two closely spaced targets, now with trajectories that actually cross, so they are indistinguishable for some number of frames in the middle of the sequence. The target SNRs are set to be 3.0 and 2.0. During the period of the crossing, these add to give brighter target return. Now the targets are apparent in the measurement data mostly during the crossing (e.g., in FIG. 7B). In the matched filter statistics of FIG. 7C, it may be apparent that there are two targets with some evidence of bi-modal distribution at the ends. The convex method gives two detections with very good trajectory estimates (e.g., in FIG. 7E). Because the target maneuvers are restricted during modeling in this example, the convex method does not erroneously swap the trajectories during the crossing (e.g., does not cause a spurious trajectory change event—which might appear as a collision—but instead resolves the trajectory crossing). The greedy method again gives only a single merged detection (but mostly on the brighter target) and fails to detect the dimmer crossing target, as seen in FIG. 7F. This may be due to the greedy subspace optimization of the first target taking all of both targets' energy during the crossing, such that insufficient energy of the dimmer target remains to produce a second detection in the greedy method. The convex method also first detects and removes the brighter target, but due to the convex regularization uses a more conservative estimate of its energy so that sufficient energy of the second target remains to still detect it. This is another example of the local search becoming trapped by a spurious local minimum, created by utilization of the non-convex combinatorial sparsity prior. By utilizing a convex sparsity prior, spurious local minima are eliminated, and a global solution may be found that better explains the data.

Figures 7A, 7B:
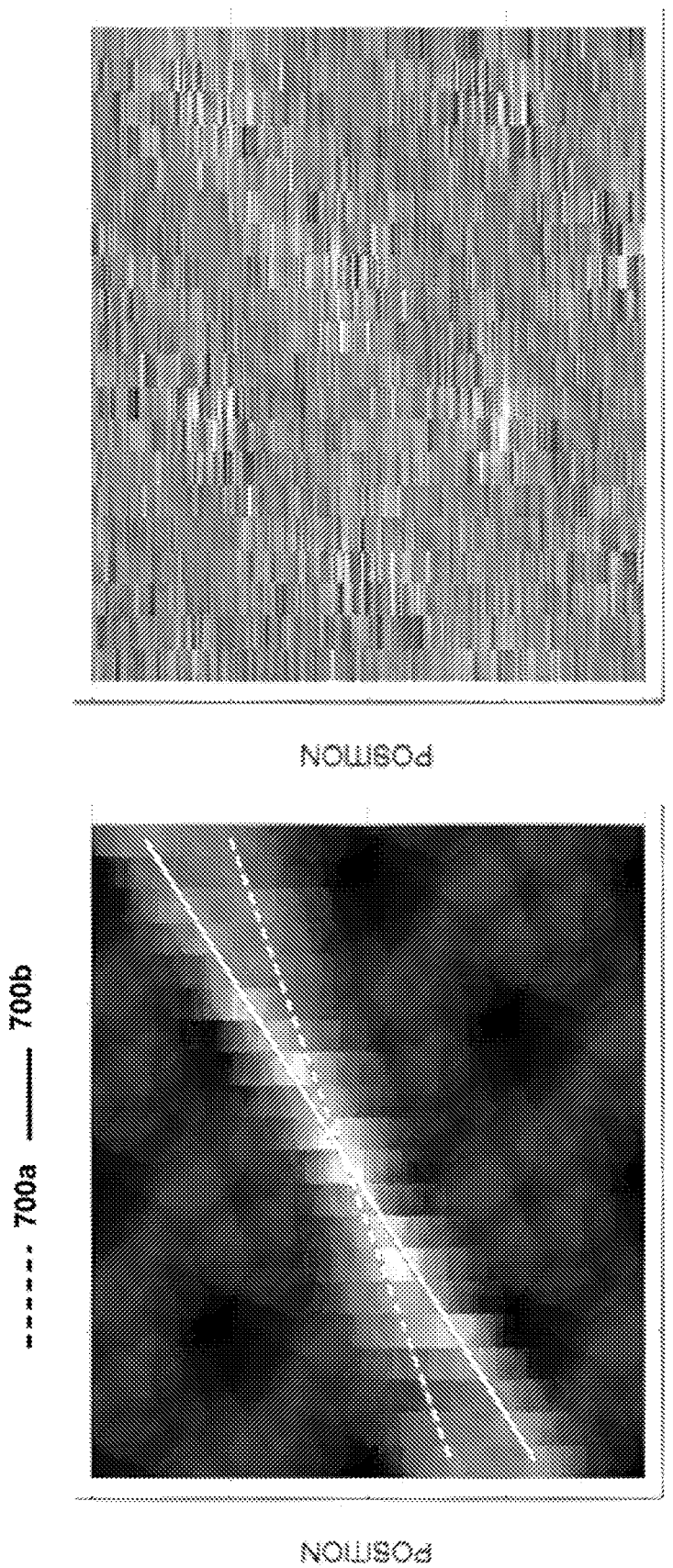
FIGS. 7A-7F are graphs depicting example target signals and detection operations in multiple frames of data for two targets with crossing trajectories, in accordance with one or more embodiment.
Figure 7D:
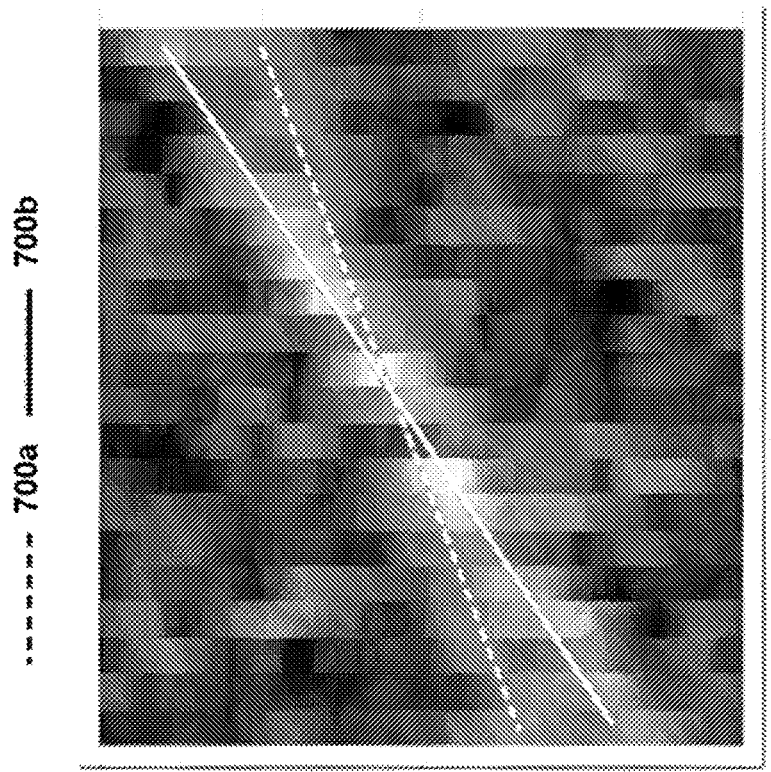
Figure 7C:
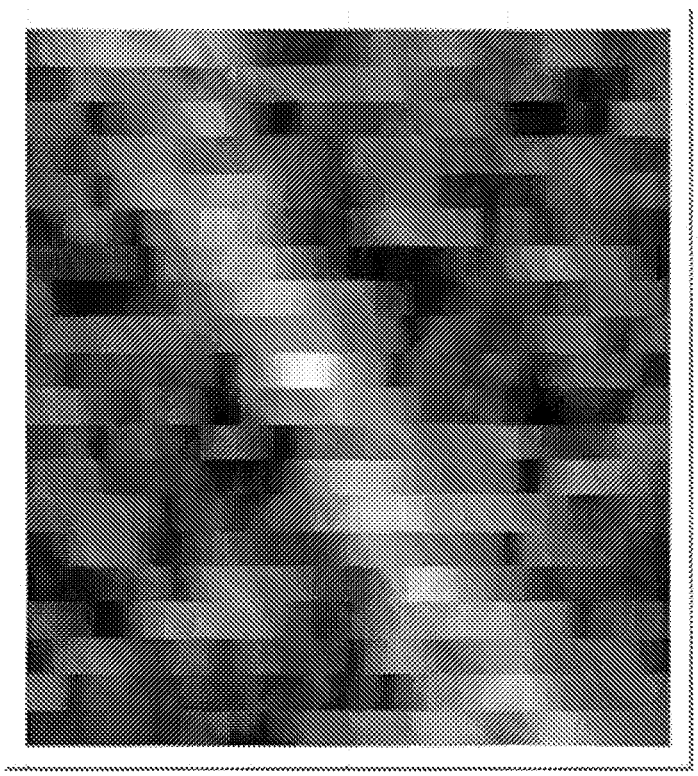
Figure 7E:
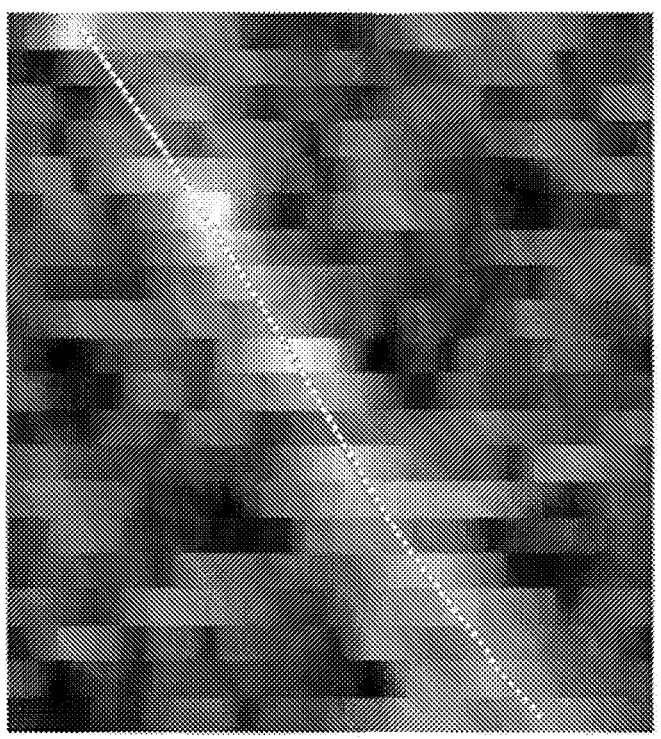
Figure 7F:
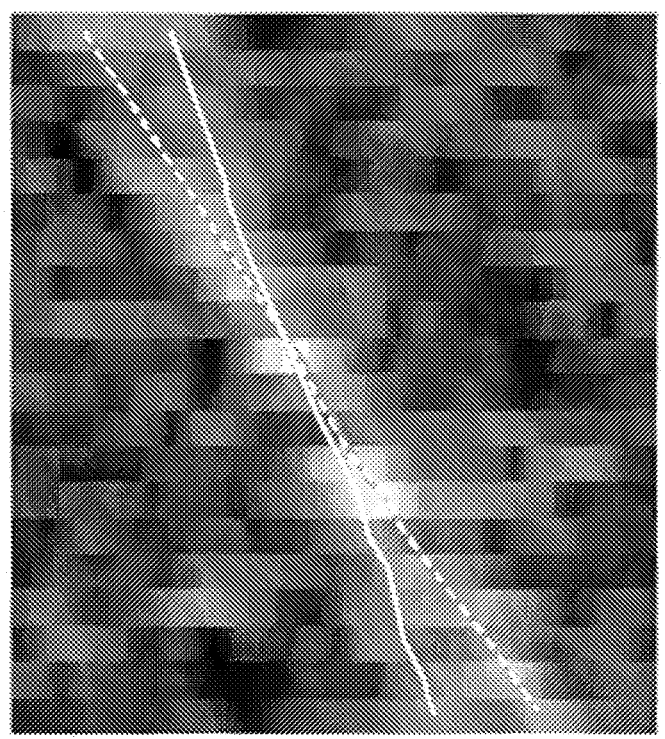

FIGS. 7A-7F are graphs depicting example target signals and detection operations in multiple frames of data for two targets with crossing trajectories. FIG. 7A depicts target signal with true target trajectories 700a and 700b overlaid. FIG. 7B depicts target signal in noise. FIG. 7C depicts per-frame matched filter detection statistics. FIG. 7D depicts matched filter statistics with true target trajectories 700a and 700b overlaid. FIG. 7E depicts convex optimization detection 710a and 710b. FIG. 7F depicts greedy detection 720.

From the illustrated examples, it is apparent that the presently disclosed method is able, in one or more embodiments, to tractably find a globally optimal detection solution, even in the presence of multiple, closely spaced/crossing, dim, maneuvering targets. Fundamentally, this property may be due to the implicit solution of a global convex optimization over all multi-target trajectory hypotheses. By contrast, the greedy method has difficulty with becoming stuck in local minimum of the non-convex formulation of the detection problem (e.g., seeking the best fit to observation data using as few paths as possible). In the greedy approach, initial detections of the brightest targets may be over-fit, preventing and/or corrupting detection of the remaining targets. In the non-convex optimization, committing to an incorrect target hypothesis may make it very difficult to escape from a local minimum to find the true global optimum of the non-convex optimization. In the convex subspace pursuit method, bright targets may be identified first, but these bright targets are fit using the group sparsity prior which allows the method to make a conservative estimate of the detected target energy so as to not over-fit the noise and/or other dimmer targets. This has the effect of leaving enough residual energy from other targets to allow the iterative subspace exploration to find other nearby/crossing targets which can then be jointly optimized with previously detected targets. Mistakes made early in the process may still be corrected at later iterations of the process. Regardless of the mechanism of the specific embodiment, the method may ultimately converge to the global optimum of the convex optimization over all possible multi-target hypotheses, and hence may not be trapped in local minimum (as there are none in the convex formulation).

Figure 8A:
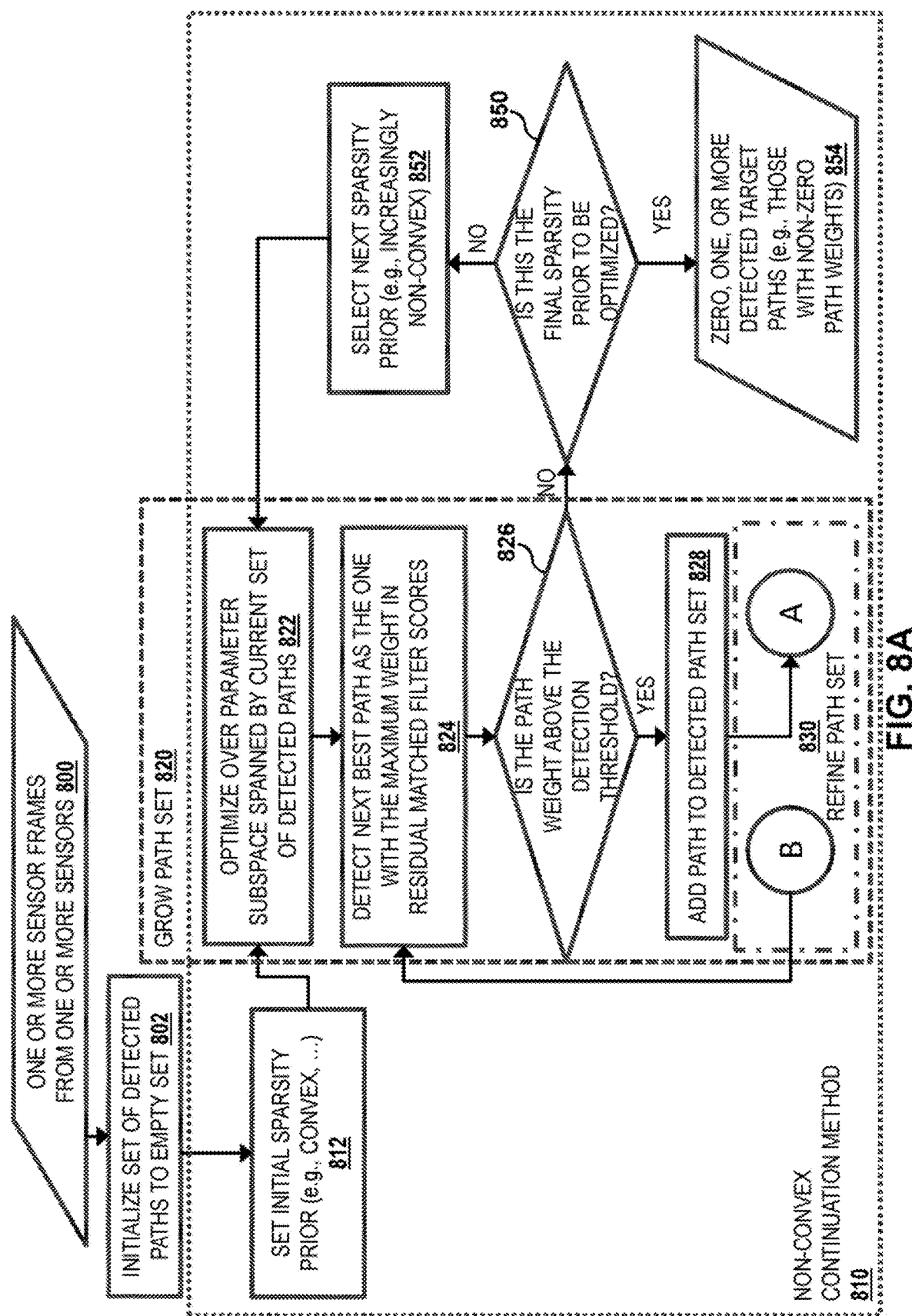
FIGS. 8A-8B are a flowchart illustrating an example method for target detection, in accordance with one or more embodiment.
Figure 8B:
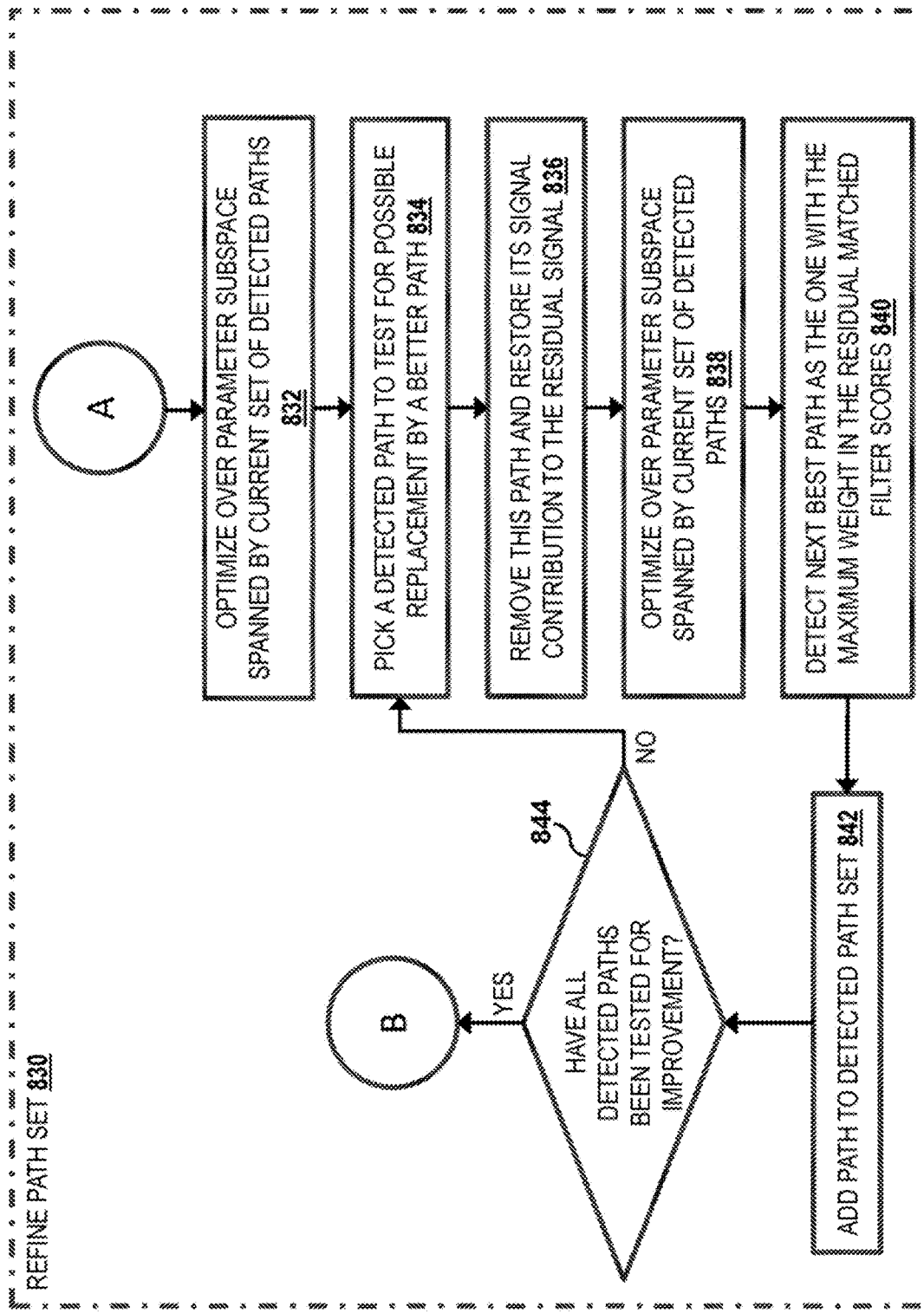

FIGS. 8A-8B illustrates an exemplary method for target detection. The operations and elements of the method presented below are intended to be illustrative. In some embodiments, method may be accomplished with one or more additional operations or elements not described, and/or without one or more of the operations or elements discussed. Additionally, the order in which the operations and elements of method are illustrated in FIG. 8A-8B and described below is not intended to be limiting. In some embodiments, one or more portions of method may be implemented (e.g., by filtering, simulation, modeling, etc.) in one or more processing devices (e.g., one or more processors). The one or more processing devices may include one or more devices executing some or all of the operations of method in response to instructions stored electronically on an electronic storage medium. The one or more processing devices may include one or more devices configured through hardware, firmware, and/or software to be specifically designed for execution of one or more of the operations of method, for example. In some embodiments, one or more elements may be stored in one or more electronic storage media, which may be in electronic communication with the one or more processing devices.

At block 800, one or more sensor frames are obtained from one or more sensors. In some embodiments, a single sensor frame may be used (e.g., target(s) may be detected in a still frame). In some embodiments, sensor frames may be obtained from multiple sensors, including sensors which scan overlapping regions, disparate regions, contiguous regions, etc. In some embodiments, a relationship between the sensor frames may be known (e.g., a vector from a first sensor frame from a first sensor may be translated into a corresponding vector expected to appear in a second sensor frame from a second sensor and vice versa). In some embodiments, the relationship between the sensor frames may be unknown (e.g., not well defined). In some embodiments, the sensor frame may contain a signal emitted by the one or more targets (e.g., passive detection). In some embodiments, the sensor frame may contain a signal emitted by another source and reflected by the one or more targets (e.g., active detection). In some embodiments, a signal from a target may contain information about a range, velocity, size, etc. of the target (such as Doppler shift, signal reception time, signal magnitude, etc.). In some embodiments, the one or more sensors may be sensors of different types, such as sensors with different ranges, active and passive sensors, etc.

At block 802, a set of detected paths is initialized to an empty set. The set of detected paths from any previous operation may be cleared. The set of detected paths from a previous operation may be built upon or compared to a new set of detected paths. Initialization may include determination of a time period, number of sensor frames, etc. for which detection is to be performed. Initialization may involve resetting of boundary or optimization conditions.

At block 810, a non-convex continuation method is performed. In some embodiments, both convex and non-convex optimizations may be performed, including in piecewise optimizations. In some embodiments, an optimization may be discontinuous. The non-convex continuation method may iteratively apply a sparsity prior, including by increasing the non-convexity of the sparsity prior, until a global optimum is reached. The non-convex continuation method may use the sparsity prior to prevent an optimization from being stuck in a local optimum, while using non-convex optimization to find a global optimum.

At block 812, an initial sparsity prior is set. In some embodiments, the initial sparsity prior may be convex. The initial sparsity prior may be set using any appropriate method, including those previously described. The initial sparsity prior may be any appropriate sparsity prior, such as those previously described.

At block 820, the path set is grown. The path set growth may be an operation which selects trajectories which may correspond to detected objects. In some embodiments, the path set growth may be an operation which operates to increase the number of detected trajectories and may operate in opposition to an operation which operates to decrease the number of detected trajectories (such as by comparing detected trajectories signal strength to noise, by application of a sparsity prior, etc.).

At block 822, the sum of the data fidelity objective and the selected sparsity prior is optimized over the parameter subspace spanned by the current set of detected paths. The sparsity prior may be a current iteration of the sparsity prior, including an initial sparsity prior, a progressively less convex sparsity prior, a terminal sparsity prior, etc. In some embodiments, the current set of detected paths may be a null set. The optimization may occur using any appropriate method, such as those previously described.

At block 824, a next best path (e.g., in addition to the current set of detected paths) may be detected as the path with the maximum weight in the residual matched filter scores. In some embodiments, the path with the maximum weight in the residual matched filter scores may be a path with a weight not significantly greater than noise (e.g., SNR~1). The residual matched filter scores may additionally or instead be any appropriate filtered signals.

At block 826, it is determined if the path weight is above the detection threshold. In some embodiments, the detection threshold may be dependent on sensor (e.g., instrument) parameters. In some embodiments, the detection threshold may be dependent on noise (e.g., inherent to the instrument, measured Gaussian noise in the signal over a time period, etc.). In some embodiments, the detection threshold may vary depending on the measurement time, type, collection period, etc. (for example, a detection threshold may be lower for optical detection at night than for optical detection during the day). If the path weight is above the detection threshold, operations may continue to block 828. If the path weight is below the detection threshold (e.g., for the current iteration), operations may continue to block 850, outside of the grow path block 820.

At block 828, the path is added to the detected path set. For some iterations (e.g., an initial iteration), the detected path set may have previously been empty. In some embodiments, the detected path set may contain many paths.

At block 830, the path set is refined. The path set refinement may be an operation which compares a first path of the path set to others of the path set and optimizes to explain signals with the fewest possible trajectories. In some embodiments, the path set refinement may be an operation which operates to decrease the number of detected trajectories. In some embodiments, the path set refinement may be an operation which operates to adjust multiple paths in order to optimize the overall contribution from all of the paths of the set to the measured signal.

At block 832, connected by transition point A of FIGS. 8A and 8B, the sum of the data fidelity objective and the selected sparsity prior is optimized over the parameter subspace spanned by the current set of detected paths, such as by any appropriate method as described previously in relation to block 822.

At block 834, a detected path is picked (e.g., from the set of detected paths) to test for possible replacement by a better path. The picked detected path may be selected based on weight, order in the set of paths, etc. The picked detected path may be selected based on any appropriate method.

At block 836, the picked detected path is removed from the set of paths (e.g., set aside) and the contribution corresponding to the picked detected path is restored to the residual signal. The picked detected path and its signal may be removed from the set of paths and the residual signal corresponding to the set of paths. The picked detected path and its signal may be removed from the set of paths, and the set of paths minus the picked detected path may be used to determine a residual signal corresponding to the current set of paths.

At block 838, the sum of the data fidelity objective and the sparsity prior is optimized over the parameter subspace spanned by the current set of detected paths. The sparsity prior may be a current iteration of the sparsity prior, including an initial sparsity prior, a progressively less convex sparsity prior, a terminal sparsity prior, etc. The optimization may occur using any appropriate method, such as those previously described in reference to block 822.

At block 840, a next best path (e.g., in addition to the set of detected paths) may be detected as the path with the maximum weight in the residual matched filter scores. The next best path may or not be the picked detected path, such as was removed in block 836. The next best path may be determined without reference to the removed picked detected path (e.g., independently of the picked detected path). In some embodiments, the path with the maximum weight in the residual matched filter scores may be a path with a weight not significantly greater than noise (e.g., SNR ~1). The residual matched filter scores may additionally or instead be any appropriate filtered signals. A next best path may be detected using any appropriate method, such as those previously described in reference to block 824.

At block 842, the path (e.g., the next best path) is added to the detected path set. The next best path may or may not be identical to the picked detected path. For example, the refinement may reproduce the picked detected path which was previously removed (e.g., the picked detected path was an optimal solution) or may produce an updated path to replace the picked detected path. For some iterations, the detected path set may have previously been empty. In some embodiments, the detected path set may contain many paths. The path may be added to the path set by any appropriate method, such as those previously described in reference to block 828.

At block 844, it may be determined if all detected paths have been tested for refinement (e.g., improvement). The detected paths may have ordinal notations, and may be tested in ordinal order (e.g., a path 1, a path 2, etc.). The detected paths may be tested in order of maximum weight. Improvement of one of the detected paths (e.g., changing of the one of the detected paths) may cause testing of the remaining paths for improvement. In some embodiments, each detected path may be improved independently. In some embodiments, multiple detected paths may be improved together. Improvement may include removal of a detected path, such as without replacement by a refined path, of a path from the detected path set. If all the detected paths (e.g., of the current path set) have been tested for improvement, flow may continue to block 824 (such as through transition point B connecting FIG. 8B to FIG. 8A). If all detected paths have not been tested for improvement, flow may continue to block 834, where another detected path may be selected for improvement.

At block 850, it is determined if the final sparsity prior is to be optimized. That is, is the current sparsity prior the final sparsity prior to be optimized. In some embodiments, this may alternatively or additionally include another termination criterion. The current iteration of the sparsity prior may be compared to a final sparsity prior (e.g., a terminal sparsity prior). If the current iteration of the sparsity prior is the final sparsity prior, flow may continue to block 854. If the current sparsity prior is not the final sparsity prior, flow may continue to block 852.

At block 852, a next sparsity prior may be selected. In some embodiments, the next sparsity prior (e.g., for the next iteration of path set growth and path set refinement) may be more non-convex than the sparsity prior of the current iteration (e.g., the iteration of the last path set growth and path set refinement iteration). In some embodiments, the next sparsity prior may be non-convex to the same degree as the sparsity prior of the current iteration, which may occur if the next sparsity prior (e.g., of iteration N+1) is changed in another (such as by use of different noise filters, different weight matrices, etc.) way from the sparsity prior of the current iteration (e.g., of iteration N). In some embodiments, a set of sparsity priors, which may be monotonically increasingly non-convex, may be determined (including pre-determined), and used for each iteration. In some embodiments, the increase in non-convexity of a next sparsity prior (e.g., of iteration N+1) may be determined by an output of the optimization of the current sparsity prior (e.g., of iteration N). For example, each optimization may have a measured degree of success (e.g., given by computation time, a data fidelity objective, etc.) and the change in convexity may be determined based on the measured degree of success. The sparsity prior selected may be any appropriate sparsity prior, such as those described previously.

At block 854, zero, one, or more detected paths (e.g., those of the detected path set with non-zero path weights) may be output. The detected paths may be output to storage. The detected paths may be output for visualization, such as to a display monitor, to a printer, to a heads-up display, etc. The detected paths may be output with or without the sensor frames, such as projected on top of the sensor frames, displayed without the sensor frames, with or without noise processing.

As described above, operations of FIGS. 8A-8B (and/or the other methods and systems described herein) are configured to determine a set of detected paths from sensor data.

Figure 9:
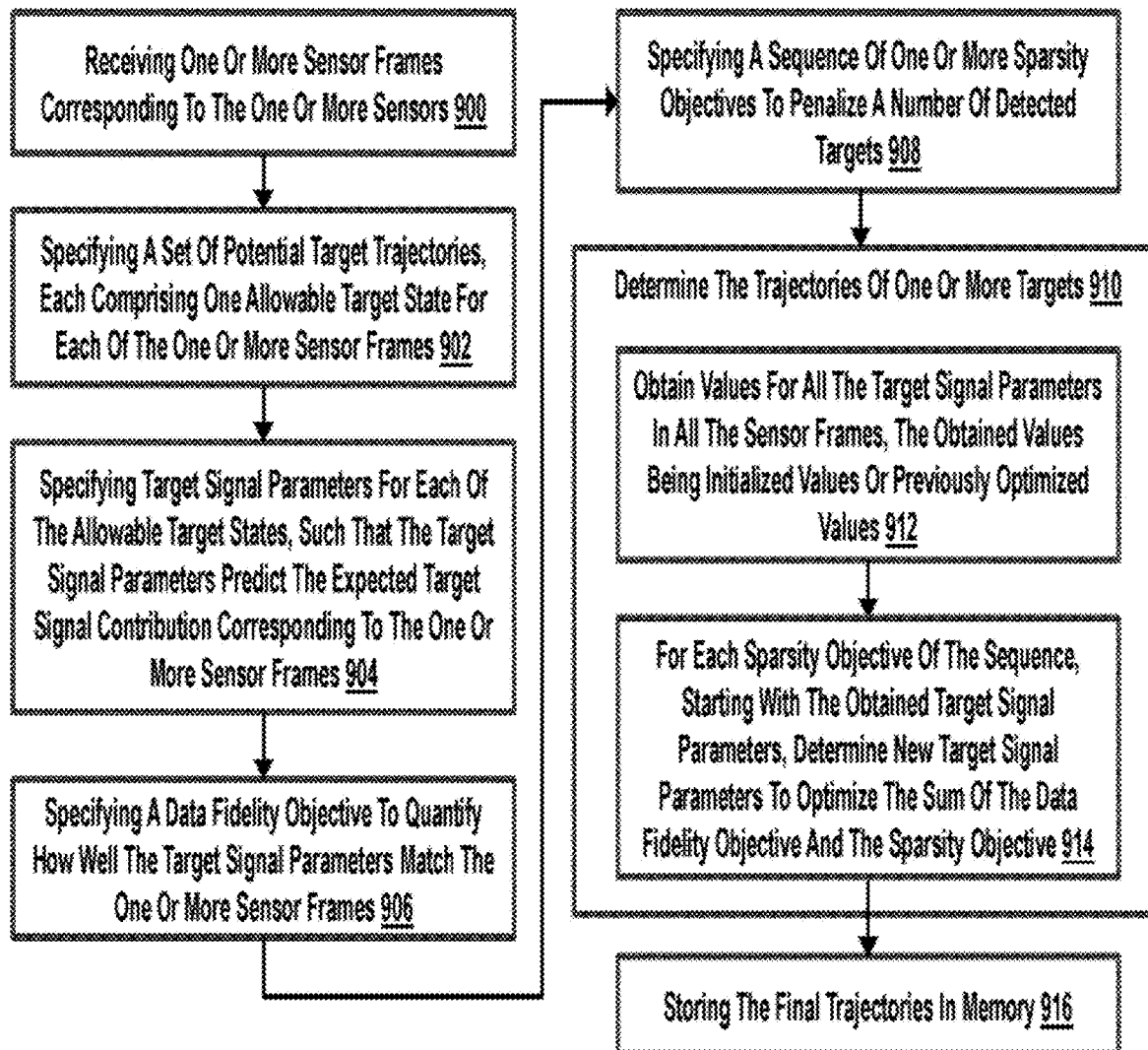
FIG. 9 illustrates an exemplary method for target detection, in accordance with one or more embodiment.

FIG. 9 illustrates an exemplary method for target detection. The operations of the method presented below are intended to be illustrative. In some embodiments, method may be accomplished with one or more additional operations not described, and/or without one or more of the operations discussed. Additionally, the order in which the operations of the method are illustrated in FIG. 9 and described below is not intended to be limiting. In some embodiments, one or more portions of method may be implemented (e.g., by filtering, simulation, modeling, etc.) in one or more processing devices (e.g., one or more processors). The one or more processing devices may include one or more devices executing some or all of the operations of method in response to instructions stored electronically on an electronic storage medium. The one or more processing devices may include one or more devices configured through hardware, firmware, and/or software to be specifically designed for execution of one or more of the operations of method, for example.

At block 900, receiving one or more sensor frames for corresponding to the one or more sensors. The receiving may be from the one or more sensors, from memory or other storage, etc. The receiving may be of real time sensor frames. The receiving may be of recorded sensor frames, including previously obtained sensor frames. The receiving may be of sensor frames for which trajectories have already been determined, such as for evaluation of target detection methods.

At block 902, specifying a set of potential target trajectories, each comprising one allowable target state for each of the one or more sensor frames. Specifying the set of potential target trajectories may include defining a space of allowable target states for the one or more sensor frames. Specifying the set of potential target trajectories may include determining a number of target trajectories. Specifying the set of potential target trajectories may include determining an intermediate set of target trajectories.

At block 904, specifying target signal parameters for each of the allowable target states, such that the target signal parameters predict the expected target signal contribution within corresponding to the one or more sensor frames. The target signal parameters may be based on a predicted brightness of the target. The target signal contribution may be determined based on the target signal parameters. The target signal contribution may be based on a PSF.

At block 906, specifying a data fidelity objective to quantify how well the target signal parameters match the one or more sensor frames. The data fidelity objective may be a weighted match. The data fidelity objective may account for noise signal. The data fidelity objective may be a threshold. The data fidelity objective may depend on a signal to noise ratio.

At block 908, specifying a sequence of one or more sparsity objectives to penalize the number of detected targets. The sparsity objectives may be specified individually. The difference (or delta) between sparsity objectives of the sequence may be specified. The sequence may include a number of iterations. The sequence may include an initial sparsity objective. The sequence may include a terminal (e.g., final) sparsity objective. The sequence may include optional sparsity objectives, where the sequence may terminate without application of one or more of the sparsity objectives of the sequence.

At block 910, determine the trajectories of one or more targets. The trajectories may be determined by any appropriate method, including those previously described. The trajectories may be determined by the operations of block 912-914.

At block 912, obtain values for all the target signal parameters in all the sensor frames, the obtained values being initialized values or previously optimized values. The obtained values may be an initial value, such as for a first iteration. The obtained values may be previously optimized values, such as for a subsequent iteration. The obtained values may be determined based on a set of detected paths.

At block 914, for each sparsity objective of the sequence, starting with the initialized or previously obtained target signal parameters, determine new target signal parameters to optimize the sum of the data fidelity objective and the sparsity objective. The new target signal parameters may be newly generated paths. The new target signal parameters may be based on a set of detected paths. The new signal parameters may be based on a set of detected paths, of which one path is selected for refinement or replacement. The target signal parameters may be determined based on optimization over the sum of the data fidelity and sparsity objective. The target signal parameters may be determined by optimization over another quantity (for example, signal strength) and then optimized over the sparsity objective. The optimization over the data fidelity objective and the sparsity objective may occur by an appropriate method, such as those described above. The optimization over the data fidelity objective and the sparsity objective may be co-optimizations. The optimization over the data fidelity objective and the sparsity objective may sequential optimizations.

At block 916, storing the final trajectories in memory. The output block 914 may be a set of detected paths (e.g., trajectories). The final trajectories may be stored in memory, such as memory in electronic communication with one or more processors which performs the optimization. The final trajectories may be output to another programming module, such as for evaluation of other sensor data, or processing unit, such as for display on a screen.

As described above, the method of FIG. 9 (and/or the other methods described herein) is configured to detect a set of zero, one, or more trajectories.

Figure 10:
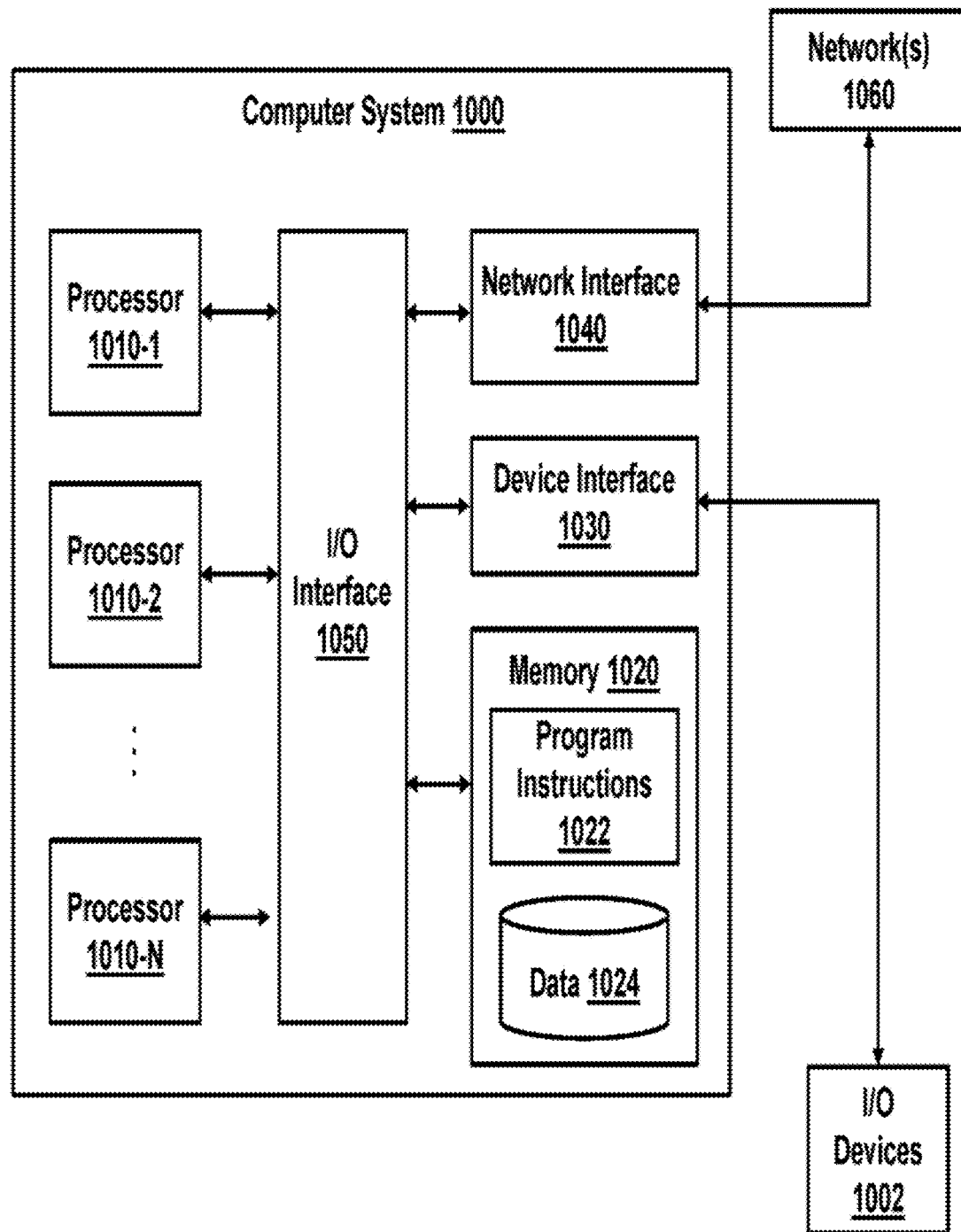
FIG. 10 illustrates an example computing system with which one or more embodiments may be implemented.

FIG. 10 is a diagram that illustrates an exemplary computing system 1000 in accordance with embodiments of the present technique. Various portions of systems and methods described herein, may include or be executed on one or more computing systems similar to computing system 1000. Further, processes and modules described herein may be executed by one or more processing systems similar to that of computing system 1000. For example, computing system 112 may execute operations using a processing system that is the same or similar to computing system 1000.

Computing system 1000 may include one or more processors (e.g., processors 1010-1-1010-N) coupled to system memory 1020, an input/output (I/O) device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010-1), or a multi-processor system including any number of suitable processors (e.g., 1010-1-1010-N). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computing systems) to implement various processing functions.

I/O devices may include devices that receive input (e.g., from a user) or output information (e.g., to a user). I/O devices 1002 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1002 may be connected to computing system 1000 through a wired or wireless connection. I/O devices 1002 may be connected to computing system 1000 from a remote location. I/O devices 1002 located on remote computer system, for example, may be connected to computing system 1000 via a network, e.g., network(s) 1060, and network interface 1040.

Network interface 1040 may include a network adapter that provides for connection of computing system 1000 to a network. Network interface 1040 may facilitate data exchange between computing system 1000 and other devices connected to the network. Network interface 1040 may support wired or wireless communication. The network, such as for example network(s) 1060, may include an electronic communication network, such as the Internet, a local area network (LAN), a wide area network (WAN), a cellular communications network, or the like.

System memory 1020 may be configured to store program instructions 1022 or data 1024. Program instructions 1022 may be executable by a processor (e.g., one or more of processors 1010-1-1010-N) to implement one or more embodiments of the present techniques. Program instructions 1022 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010-1-1010-N) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010-1-1010-N, system memory 1020, network interface 1040, I/O devices 1002, and/or other peripheral devices. I/O interface 1050 may perform protocol, timing, or other data transformations to convert data signals from one component (e.g., system memory 1020) into a format suitable for use by another component (e.g., processors 1010-1-1010-N). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 1000 or multiple computing systems 1000 configured to host different portions or instances of embodiments. Multiple computing systems 1000 may provide for parallel or sequential processing/execution of one or more portions of the techniques described herein.

Those skilled in the art will appreciate that computing system 1000 is merely illustrative and is not intended to limit the scope of the techniques described herein. Computing system 1000 may include any combination of devices or software that may perform or otherwise provide for the performance of the techniques described herein. For example, computing system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 1000 may be transmitted to computing system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square," "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A method for detecting trajectories of one or more targets in a field of view of one or more sensors, the method comprising: receiving one or more sensor frames corresponding to the one or more sensors; defining a space of allowable target states for the one or more sensor frames; specifying a set of potential target trajectories, each comprising one allowable target state for each of the one or more sensor frames; specifying target signal parameters for each of the allowable target states, such that the target signal parameters predict an expected target signal contribution corresponding to the one or more sensor frames; specifying a data fidelity objective to quantify how well the target signal parameters match the one or more sensor frames; specifying a sequence of one or more sparsity objectives to penalize a number of detected targets; determine trajectories of one or more targets as follows: obtain values for all the target signal parameters in all the one or more sensor frames, the obtained values being initialized values or previously optimized values, for each sparsity objective of the sequence, starting with the obtained values for the target signal parameters, determine new values for target signal parameters to optimize a sum of the data fidelity objective and the given sparsity objective; and storing final determined trajectories in memory.
2. The method of embodiment 1 wherein the one or more sparsity objectives of the sequence become increasingly non-convex.
3. The method of embodiment 1 wherein the one or more sparsity objectives of the sequence become increasingly non-convex to better promote sparsity of the determined target trajectories.
4. The method of embodiment 2 or 3 wherein the sequence of one or more sparsity objectives begins with a convex objective.
5. The method of embodiment 2 or 3 wherein the sequence of one or more sparsity objectives begins with a convex objective so as to be tractable for global optimization.
6. The method of any one of embodiment 1 to 5 wherein the data fidelity objective is convex.
7. The method of any one of embodiments 1 to 6 wherein the one or more sparsity objectives are each a mixture of a convex sparsity objective and a non-convex sparsity objective, with a weight of the non-convex sparsity objective being increased in the sequence.
8. The method of embodiment 7 wherein the convex sparsity objective is a weighted group sparsity prior, corresponding to a sum over all potential target trajectories of a norm of weighted target parameters of each trajectory.
9. The method of embodiment 7 or 8 wherein the non-convex sparsity objective is a number of target trajectories with one or more non-zero target signal parameters.
10. The method of any one of embodiments 6 to 9 wherein the convex data fidelity objective is a squared norm of a difference between data of the one or more sensor frames and a sum of all target signal contributions predicted by the target signal parameters.
11. The method of any one of embodiments 1 to 10 wherein the optimization of the sum of the data fidelity objective and the given sparsity objective is obtained by performing a sequence of optimizations over subspaces of the target signal parameters associated to subsets of all potential target trajectories, until one or more termination conditions are met.
12. The method of embodiment 11 wherein the subset of all potential target trajectories being optimized is incrementally grown by selecting a next best trajectory to include by solving a maximum-weight path problem in a graph of allowable state transitions.
13. The method of embodiment 11 or 12 wherein a trajectory from the subset of all potential target trajectories being optimized is updated as follows: remove the trajectory from the subset and set the target signal parameters of the trajectory to zero; reoptimize the target signal parameters of remaining trajectories of the subset in the absence of the removed trajectory; and select the next best trajectory to include by solving a maximum-weight path problem in the graph of allowable state transitions.
14. The method of embodiment 12 or 13 wherein the maximum-weight path problem is solved via a Viterbi algorithm.
15. The method of any one of embodiments 11 to 14 wherein the termination condition is that a weight of the next best trajectory to add is below a threshold.
16. The method of any one of embodiment 11 to 15 wherein the optimization over the subspace of associated target signal parameters is performed by iterative group coordinate descent, where at each iteration the set of all target signal parameters associated to a given target trajectory are jointly optimized while holding all other target signal parameters fixed.
17. The method of embodiment 16 wherein the group coordinate descent is computed using a group shrinkage operation.
18. The method of any one of embodiments 11 to 17, wherein: the data fidelity objective is a squared norm of a difference between data of the one or more sensor frames and a sum of all target signal contributions predicted by the target signal parameters; the one or more sparsity objectives are each a mixture of the a weighted group sparsity prior, corresponding to a sum over all potential target trajectories of a norm of weighted target parameters of each trajectory, and the a number of target trajectories with one or more non-zero target signal parameters, with the weight on the number of target trajectories being increased in the sequence.
19. The method of any one of embodiments 1 to 18, further comprising steps for displaying the final trajectories to a user.
20. A system comprising: one or more sensors; memory; and one or more processors coupled to the one or more sensors, the one or more processors being configured to: receive one or more sensor frames corresponding to the one or more sensors; define a space of allowable target states for the one or more sensor frames; specify a set of potential target trajectories, each comprising one allowable target state for each of the one or more sensor frames; specify target signal parameters for each of the allowable target states, such that the target signal parameters predict an expected target signal contribution corresponding to the one or more sensor frames; specify a data fidelity objective to quantify how well the target signal parameters match the one or more sensor frames; specify a sequence of one or more sparsity objectives to penalize a number of detected targets; determine trajectories of one or more targets as follows: obtain values for all the target signal parameters in all the one or more sensor frames, the obtained values being initialized values or previously optimized values, for each sparsity objective of the sequence, starting with the obtained target signal parameters, determine values for new target signal parameters to optimize a sum of the data fidelity objective and the given sparsity objective; and store final determined trajectories in memory.

21. The system of embodiment 20, wherein the one or more sensors are electro-optical/infrared cameras.

22. The system of embodiment 20 or 21, wherein the one or more sensors are radar sensors.

What is claimed is:

1. A non-transitory machine-readable medium storing instructions that when executed by one or more processors effectuate operations comprising:
receiving one or more sensor frames corresponding to the one or more sensors;
defining a space of allowable target states for the one or more sensor frames;
specifying a set of potential target trajectories, each comprising one allowable target state for each of the one or more sensor frames;
specifying target signal parameters for each of the allowable target states, such that the target signal parameters predict an expected target signal contribution corresponding to the one or more sensor frames;
specifying a data fidelity objective to quantify how well the target signal parameters match the one or more sensor frames;
specifying a sequence of one or more sparsity objectives to penalize a number of detected targets;
determining trajectories of one or more targets as follows:
obtaining values for all the target signal parameters in all the one or more sensor frames, the obtained values being initialized values or previously optimized values,
for each sparsity objective of the sequence, starting with the obtained values for the target signal parameters, determining new values for target signal parameters to optimize a sum of the data fidelity objective and the given sparsity objective; and
storing final determined trajectories in memory.

2. The non-transitory machine-readable medium of claim 1 wherein the one or more sparsity objectives of the sequence become increasingly non-convex.

3. The non-transitory machine-readable medium of claim 2 wherein the sequence of one or more sparsity objectives begins with a convex objective.

4. The non-transitory machine-readable medium of claim 1 wherein the data fidelity objective is convex.

5. The non-transitory machine-readable medium of claim 1 wherein the one or more sparsity objectives are each a mixture of a convex sparsity objective and a non-convex sparsity objective, with a weight of the non-convex sparsity objective being increased in the sequence.

6. The non-transitory machine-readable medium of claim 5 wherein the convex sparsity objective is a weighted group sparsity prior, corresponding to a sum over all potential target trajectories of a norm of weighted target parameters of each trajectory.

7. The non-transitory machine-readable medium of claim 5 wherein the non-convex sparsity objective is a number of target trajectories with one or more non-zero target signal parameters.

8. The non-transitory machine-readable medium of claim 4 wherein the convex data fidelity objective is a squared norm of a difference between data of the one or more sensor frames and a sum of all target signal contributions predicted by the target signal parameters.

9. The non-transitory machine-readable medium of claim 1 wherein the optimization of the sum of the data fidelity objective and the given sparsity objective is obtained by performing a sequence of optimizations over subspaces of the target signal parameters associated to a subset of all potential target trajectories, until one or more termination conditions are met.

10. The non-transitory machine-readable medium of claim 9 wherein the subset of all potential target trajectories being optimized is incrementally grown by selecting a next best trajectory to include by solving a maximum-weight path problem in a graph of allowable state transitions.

11. The non-transitory machine-readable medium of claim 10 wherein a trajectory from the subset of all potential target trajectories being optimized is updated as follows:
remove the trajectory from the subset and set the target signal parameters of the trajectory to zero;
reoptimize the target signal parameters of remaining trajectories of the subset in the absence of the removed trajectory; and
select the next best trajectory to include by solving the maximum-weight path problem in the graph of allowable state transitions.

12. The non-transitory machine-readable medium of claim 11 wherein the maximum-weight path problem is solved via a Viterbi algorithm.

13. The non-transitory machine-readable medium of claim 10 wherein the termination condition is that a weight of the next best trajectory to add is below a threshold.

14. The non-transitory machine-readable medium of claim 9 wherein the optimization over the subspace of associated target signal parameters is performed by iterative group coordinate descent, where at each iteration the set of all target signal parameters associated to a given target trajectory are jointly optimized while holding all other target signal parameters fixed.

15. The non-transitory machine-readable medium of claim 14 wherein the group coordinate descent is computed using a group shrinkage operation.

16. The non-transitory machine-readable medium of claim 1, wherein:
the data fidelity objective is a squared norm of a difference between data of the one or more sensor frames and a sum of all target signal contributions predicted by the target signal parameters; and
the one or more sparsity objectives are each a mixture of a weighted group sparsity prior, corresponding to a sum over all potential target trajectories of a norm of weighted target parameters of each trajectory, and a number of target trajectories with one or more non-zero target signal parameters, with the weight on the number of target trajectories being increased in the sequence.

17. The non-transitory machine-readable medium of claim 1, wherein the instructions, when executed by one or more processors, effectuate further operations comprising steps for displaying the final trajectories to a user.

18. A system comprising:
one or more sensors;
memory; and
one or more processors coupled to the one or more sensors, the one or more processors being configured to:
receive one or more sensor frames corresponding to the one or more sensors;

define a space of allowable target states for the one or more sensor frames;

specify a set of potential target trajectories, each comprising one allowable target state for each of the one or more sensor frames;

specify target signal parameters for each of the allowable target states, such that the target signal parameters predict an expected target signal contribution corresponding to the one or more sensor frames;

specify a data fidelity objective to quantify how well the target signal parameters match the one or more sensor frames;

specify a sequence of one or more sparsity objectives to penalize a number of detected targets;

determine trajectories of one or more targets as follows:
obtain values for all the target signal parameters in all the one or more sensor frames, the obtained values being initialized values or previously optimized values, for each sparsity objective of the sequence, starting with the obtained target signal parameters, determine values for new target signal parameters to optimize a sum of the data fidelity objective and the given sparsity objective; and store final determined trajectories in the memory.

19. The system of claim 18, wherein the one or more sensors are electro-optical/infrared cameras.

20. The system of claim 18, wherein the one or more sensors are radar sensors.

21. A non-transitory machine-readable medium storing instructions that when executed by one or more processors effectuate operations comprising:

receiving one or more sensor frames corresponding to the one or more sensors;

defining a space of allowable target states for the one or more sensor frames;

specifying a set of potential target trajectories, each comprising one allowable target state for each of the one or more sensor frames;

specifying target signal parameters for each of the allowable target states, such that the target signal parameters predict an expected target signal contribution corresponding to the one or more sensor frames;

specifying a data fidelity objective to quantify how well the target signal parameters match the one or more sensor frames;

specifying a sequence of one or more sparsity objectives to penalize a number of detected targets, wherein at least part of some of the one or more sparsity objectives are convex;

determining trajectories of one or more targets as follows:
obtaining values for all the target signal parameters in all the one or more sensor frames, the obtained values being initialized values or previously optimized values, for each sparsity objective of the sequence, starting with the obtained values for the target signal parameters, determining new values for target signal parameters to optimize a sum of the data fidelity objective and the given sparsity objective; and storing final determined trajectories in memory.

* * * * *